(12) United States Patent
Koenigsmann et al.

(10) Patent No.: US 11,879,176 B2
(45) Date of Patent: Jan. 23, 2024

(54) METAL OXIDE NANOWIRES IN SUPPORTED NANOPARTICLE CATALYSIS

(71) Applicant: Fordham University, Bronx, NY (US)

(72) Inventors: Christopher Koenigsmann, Mount Kisco, NY (US); Alexander Charles Santulli, Lexington, SC (US)

(73) Assignee: FORDHAM UNIVERSITY, Bronx, NY (US)

( * ) Notice: Subject to any disclaimer, the term of this patent is extended or adjusted under 35 U.S.C. 154(b) by 603 days.

(21) Appl. No.: 16/739,498

(22) Filed: Jan. 10, 2020

(65) Prior Publication Data

US 2021/0214851 A1 Jul. 15, 2021

(51) Int. Cl.
| | |
|---|---|
| C25B 11/04 | (2021.01) |
| C25B 1/00 | (2021.01) |
| C25B 11/081 | (2021.01) |
| C25B 11/057 | (2021.01) |
| H01M 4/92 | (2006.01) |
| H01M 4/90 | (2006.01) |
| B82Y 30/00 | (2011.01) |

(52) U.S. Cl.
CPC .......... *C25B 11/081* (2021.01); *C25B 11/057* (2021.01); *H01M 4/9075* (2013.01); *H01M 4/925* (2013.01); *B82Y 30/00* (2013.01)

(58) Field of Classification Search
CPC ..... B01J 23/462; H01M 4/9075; H01M 4/925
See application file for complete search history.

(56) References Cited

U.S. PATENT DOCUMENTS

| | | | |
|---|---|---|---|
| 8,278,011 B2 | 10/2012 | Zhu et al. | |
| 9,623,481 B2 | 4/2017 | Wong et al. | |
| 9,624,598 B2 | 4/2017 | Wong et al. | |
| 9,718,054 B2 | 8/2017 | Scher et al. | |
| 10,195,603 B2 | 2/2019 | Scher et al. | |
| 2012/0041246 A1 | 2/2012 | Scher et al. | |
| 2014/0349203 A1* | 11/2014 | Klose-Schubert | H01M 4/9016 204/290.01 |

FOREIGN PATENT DOCUMENTS

| | | | | |
|---|---|---|---|---|
| CN | 107867726 B | * | 7/2019 | ............ B01F 3/0803 |
| WO | WO-2012051482 A2 | * | 4/2012 | .............. B01J 13/02 |

OTHER PUBLICATIONS

Sztaberek et al (Sol-Gel Synthesis of Ruthenium Oxide Nanowires To Enhance Methanol Oxidation in Supported Platinum Nanoparticle Catalysts, ACS Omega 2019, 4, 14226-14233), publcation date Aug. 21, 2019.*

Yeom et al (Methanol Electro-oxidation of Electro-spun RuO2 Supported Platinum Catalyst, Korean Journal of Material Research, vol. 21 No. 8, 2011, p. 419-424).*

(Continued)

*Primary Examiner* — Jun Li
(74) *Attorney, Agent, or Firm* — Katten Muchin Rosenman LLP

(57) ABSTRACT

The present disclosure is concerned with metal oxide nanowires, and more specifically, to crystalline ruthenium oxide ($RuO_2$) nanowires, sol-gel synthetic methods for preparing the nanowires, and methods of using the nanowires in metal catalyzed oxidation of small organic molecules.

19 Claims, 13 Drawing Sheets

(56) References Cited

OTHER PUBLICATIONS

English translation of Yeom et al (Methanol Electro-oxidation of Electro-spun RuO2 Supported Platinum Catalyst, Korean Journal of Material Research, vol. 21 No. 8, 2011, p. 419-424).*

Kim et al (Ruthenium Oxide Incorporated One-Dimensional Cobalt Oxide Composite Nanowires as Lithium-Oxygen Battery Cathode Catalysts, ChemCatChem 2017, 9, 3554-3562).*

Kang et al., The effect of a metallic Ni core on charge dynamics in CdS-sensitized p-type NiO nanowire mesh photocathodes, RSC Adv., 2013, 3, 13342-13347.*

Yang, L.X. et al., "A study of PtRuO2 catalysts thermally formed on titanium mesh for methanol oxidation", Electrochimica Acta 50 (2005), p. 1217-1223.

Shao, Zhi-Gang et al., "PtRuO2/Ti anodes with a varuing Pt:Ru ratio for direct methanol fuel cells", Journal of Power Sources 161 (2006) p. 813-819.

Pietron, Jeremy J. et al., "Direct methanol oxidation at low overpotentials using Pt nanoparticles electrodeposited at ultrathin condustive RuO2 nanoskins", Journal of Materials Chemistry 22 (2012) p. 5197-5204.

Zhong, Chuan-Jian et al., "Fuel cell technology: nano-engineered multimetallic catalysts", Energy Environ. Sci. 1 (2008) p. 454-466.

Ramli, Z.A.C et al., "Platinum-Based Catalysts on Various Carbon Supports and Confucting Polymers for Direct Methanol Fuel Cell Applications: a Review", Nanoscale Research Letters 13:410 (2018) p. 1-25.

Nonaka, H. et al., "Electrochemical oxidation of carbon monoxide, methanol, formic acid, ethanol, and acetic acid on a platinum electrode under hot aqueous conditions" Journal of Electroanalytical Chemistry 520 (2002) p. 101-110.

Profeti, L.P.R. et al., "Pt—RuO2 electrodes prepared by thermal decomposition of polymeric precursors as catalysts for direct methanol duel cell applications" International Journal of Hydrogen Energy 34 (2009) p. 2747-2757.

Huang, Huajie et al., "Pt nanoparticles grown on 3D RuO2-modified graphene architectures for highly efficient methanol oxidation" Journal of Materials Chemistry A 5 (2017) p. 4560-4567.

An, Geon-Hyoung et al., "Ruthenium and ruthenium oxide nanofiber supports for enhanced activity of platinum electrocatalysts in the methanol oxidation reaction" Physical Chemistry Chem. Phys. 18 (2016) p. 14859-14866.

Spataru, Tanta et al., "Electrochemical Deposition of Pt—RuOx. nH2O Composites on Condusctive Diamond and Its Application to Methanol Oxidation in Acidic Media" Electrocatalysis 7(2016) p. 140-148.

Ho, Van Thi Thanh et al., Advanced nanoelectrocatalyst for methanol oxidation and oxygen reduction reaction, fabricated as one-dimensional pt nanowires on nanostructured robust Ti0.7Ru0.3O2 support Nano Energy 1 (2012) p. 687-695.

Peng, Feng et al., "The role of RuO2 in the electrocatalytic ocidation of methanol for direct methanol fuel cell" Catalysis Communications 10 (2009) p. 533-537.

Kunimatsu, K. et al., "Tole of Absorbed species in Methanol Oxidation on Pt Studied by ATR-FTIRAS Combined with Linear Potential Sweep Voltammetry" Journal of Electroanalytical Chemistry 632 (2009) p. 109-119.

Thanh Ho, Van This et al., "Robust Non-Carbon Ti0.7Ru0.3O2 Support with Co-catalytic Functionality for Pt: Enhances Catalytic Activity and Durability for Fuel Cells" Energy Environment Science 4 (2011) p. 4194-4200.

Rolison, Debra R. et al., "Role of Hydrous Ruthenium Oxide in Pt—Ru Direct Methanol Fuel Cell Anode Electrocatalysts: The Importance of Mixed Electron/Proton Conductivity" Langmuir 15 (1999) p. 774-779.

McKeown, David A. et al., "Structure of Hydrous Ruthenium Oxides: Implication for Charge Storage" J. Phys. Chem B 103 (1999) p. 4825-4832.

Dmowski, Wojtek et al., "Local Atomic Structure and Conduction Mechanism of Nanocrystalline Hydrous RuO2 from X-ray Scattering" J. Phys. Chem. B 106 (2002) p. 12677-12683.

Şen, Fatih et al., "Different Sized Platinum Nanoparticles Supported on Carbon: An XPS Study on These Methanol Oxidation Catalysts" J. Phys. Chem. C 111 (2007) p. 5715-5720.

Shao, Yuyan et al., "Understanding and Approaches for the Durability Issues of Pt-bases Catalysts for PEM Fuel Cell" Journal of Power Sources 171 (2007) p. 558-566.

Antolini, E., "An Overview of Platinum-based Catalysts an Methanol Resistant Oxygen Reduction Materials for Direct Methanol Fuel Cells" Journal of Alloys and Compounds 461 (2008) p. 253-262.

Zhong, Chuan-Jian et al., "Nanostructured Catalysts in Fuel Cells" Nanotechnology 21 (2010) p. 1-20.

Joo, Sang Hoon et al., "Size Effect of Ruthenium Nanoparticles in Catalytic Carbon Monoxide Oxidation" Nano Lett. 10 (2010) p. 2709-2713.

Antolini, Ermete et al., "The Renaissance of Unsupported Nanostructured Catalysts for Low-temp Fuel Cells: From the Size to the Shape of Metal Nanostructures" J Mater Sci 46 (2011) p. 4435-4457.

Cui, Chun-Hua et al., "Direct Evidence of Active Site-dependent Formic Acid Electro-oxidation by Topmost Surface Atomic Redistribution in a Ternary PtPdCu Electrocatalyst" Chem Comm 48 (2012) p. 12062-12064.

Qadir, Kamran et al., "Intrinsic Relation Between Catalytic Activity of CO Oxidation on Ru Nanoparticles and Ru Oxides Uncovered with Ambient Pressure XPS" American Chemical Society 12 (2012) p. 5761-5768.

Qadir, Kamran et al., "Deactivation of Ru Catalysts under Catalytic CO Oxidation by Formation of Bulk Ru Oxide Probed by Ambient Pressure XPS" The Journal of Physical Chemistry 117 (2013) 13108-13113.

Morgan, David J. et al., "Resolving Ruthenium: XPS Studies of Common Ruthenium Materials" Surf. Interface Anal. 47 (2015) p. 1072-1079.

Koenigsmann, Christopher et al., "Tailoring Chemical Composition To Achieve Enhanced Methanol Oxidation Reaction and Methanol-Tolerant Oxygen Reduction Reaction Performance in Palladium-Based Nanowire Systems" American Chemical Society 3 (2013) p. 2031-2040.

Koenigsmann, Christopher et al., "Size-Dependent Enhancement of Electrocatalytic Performance in Relatively Defect-Free, Processed Ultrathin Platinum Nanowires" American Chemical Society 10 (2010) p. 2806-2811.

Moghaddam, Reza B., et al., "Support Effects on the Oxidation of Methanol at Platinum Nanoparticles" Electrochemistry Communications 13 (2011) p. 704-706.

* cited by examiner

METAL OXIDE NANOWIRES IN SUPPORTED NANOPARTICLE CATALYSIS

TECHNICAL FIELD

The subject matter described herein relates generally to metal oxide nanowires, and more specifically, to crystalline ruthenium oxide ($RuO_2$) nanowires, sol-gel synthetic methods for preparing the nanowires, and methods of using the nanowires in metal catalyzed oxidation of small organic molecules.

BACKGROUND

The electrochemical oxidation of small organic molecules (SOM) is a key electrochemical process and has broad technological applications in fuel cells, sensors, and catalysis. (Zhong, C. J. et al., *Energy Environ. Sci.* 2008, 1, 454-466; Antolini, E. et al., *J. Mater. Sci.* 2011, 46, 1-23; Chuan-Jian, Z. et al., *Nanotechnology* 2010, 21, 062001; Antolini, E. et al., *J. Alloys Compd.* 2008, 461, 253-262; Koenigsmann, C.; Wong, S. S., *Energy Environ. Sci.* 2011, 4, 1161-1176). Recently, attention has focused on the oxidation of alcohols such as methanol and ethanol utilizing an ever-broadening array of Platinum (Pt) based electrocatalysts. Considerable increases in catalytic activity and stability have been achieved by tuning the size, composition, and morphology of Pt catalysts. While the catalyst is responsible for much of the chemistry, the catalyst support can also play a crucial role in the mechanism of SOM oxidation. Traditionally, Pt catalysts are supported on nanoparticulate carbon such as Vulcan XC-72R. (Moghaddam, R. B. et al., *Electrochem. Commun.* 2011, 13, 704-706; Sharma, S.; et al., *J. Power Sources* 2012, 208, 96-119; Ramli, Z. A. C.; et al., *Nanoscale Res. Lett.* 2018, 13, 410-410). However, carbon supports are susceptible to oxidation and degradation during the SOM oxidation, which can lead to loss of Pt utilization and poor long-term durability of the catalyst. (Shao, Y.; Yin, G.; Gao, Y., *J. Power Sources* 2007, 171, 558-566).

In addition to challenges with the stability of catalyst support, the effective oxidation of SOMs on Pt requires high overpotentials because of catalyst poisoning effects. (Hamnett, A., *Interfacial Electrochemistry: Theory, Experiment and Applications*, Wieckowski, A., Ed. Marcel Dekker: New York, N.Y., 1999; pp 843-879; Kunimatsu, K.; Hanawa, H.; Uchida, H.; Watanabe, M., *J. Electroanal. Chem.* 2009, 632, 109-119; Nonaka, H.; Matsumura, Y., *J. Electroanal. Chem.* 2002, 520, 101-110). For example, methanol oxidation (Equation 1) on Pt follows an indirect pathway that leads to the preferential formation of carbon monoxide (CO) as a partially oxidized intermediate.

$$CH_3OH + H_2O \rightarrow 6H^+ + CO_2 + 6e^- \qquad (1)$$

However, at low overpotentials, adsorbed methanol is rapidly converted to CO via a multistep dehydrogenation process that occurs at Pt—Pt pair sites. Since CO oxidation requires a significant overpotential, the kinetics of methanol oxidation are hindered at low overpotentials by the high coverage of CO. This effect is commonly referred to as "CO poisoning" and it is a key challenge with oxidizing a broad range of SOMs on Pt.

In light of the challenges surrounding catalytic activity and stability, there is a need for new supports that overcome issues with the currently used catalysts, such as the documented CO poisoning effect.

BRIEF SUMMARY

In one aspect, the subject matter described herein is directed to crystalline metal oxide nanowires. In an embodiment, the metal oxide nanowires are crystalline ruthenium oxide ($RuO_2$) nanowires.

In another aspect, the subject matter described herein is directed to catalysts, which comprise crystalline nanowires. In an embodiment, the nanowires are $RuO_2$ nanowires. In a further embodiment, the catalysts are Pt-based catalysts.

In another aspect, the subject matter described herein is directed to a method of preparing crystalline metal oxide nanowires. In an embodiment, the metal oxide nanowires are crystalline $RuO_2$ nanowires.

In another aspect, the subject matter described herein is directed to the use of catalysts for the oxidation of small organic molecules where the catalysts are supported by crystalline $RuO_2$ nanowires. In an embodiment, the small organic molecule is methanol.

These and other aspects are disclosed in further detail below

BRIEF DESCRIPTION OF THE FIGURES

FIG. 1A shows a SEM image of the 1D structure of the $RuO_2$ nanomaterials with an average diameter of 128±15 nm. FIG. 1B shows a SEM image of the $RuO_2$ nanomaterials having various lengths up to ~3 μm.

(FIG. 3B) a TEM image of the Pt nanoparticles (NP) dispersed onto the surface of the $RuO_2$ nanowires (NWs) (Pt NP/$RuO_2$ NW); and (FIG. 3C) a HRTEM image of the $RuO_2$ nanowires revealing the {110} plane of the polycrystalline grains.

FIG. 6B shows chronoamperograms collected at 0.7 V of Pt mass activity as a function of time.

DETAILED DESCRIPTION

Figure 1A:
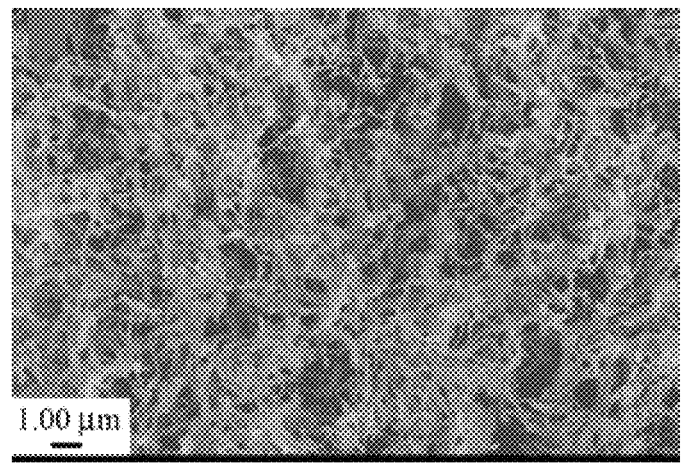
FIGS. 1A and 1B show Scanning Electron Microscope (SEM) images of the $RuO_2$ nanomaterials.

As an example of the crystal metal oxide nanowires disclosed herein, tetragonal $RuO_2$ nanowires with a uniform diameter of ~130 nm were prepared utilizing a template-directed sol-gel synthesis method. A solution-based method was employed to deposit a uniform dispersion of Pt NPs (~3 nm) on the surface of the $RuO_2$ nanowires to prepare a hybrid Pt NP/$RuO_2$ NW (i.e., catalyst). The methanol oxidation reaction (MOR) performance of the hybrid Pt NP/$RuO_2$ NWs is compared with that of Pt NPs supported on commercially available Vulcan XC-72R carbon nanoparticles (Pt NP/C). The $RuO_2$ support leads to measurable enhancements in the onset potential, kinetics, Pt utilization, and long-term stability of MOR relative to the commercial Pt NP/C. A study of the key mechanistic intermediates including CO and formic acid reveals that the crystalline $RuO_2$ supports leads to significant improvements in the CO tolerance of the Pt NPs supported on the $RuO_2$. Electrochemical investigations revealed the crystalline Pt NPs supported on $RuO_2$ nanowires required a lower overpotential to oxidize methanol and had better long-term MOR activity than Pt NPs supported on traditional carbon supports. In addition, X-ray photoelectron spectroscopy (XPS) results show that crystalline $RuO_2$ leads to less significant oxidation of the Pt NPs relative to the results observed for hydrated $RuO_2$ supports.

The present invention can be understood more readily by reference to the following detailed description of the invention and the Examples included therein. However, many modifications and other embodiments of the presently disclosed subject matter set forth herein will come to mind to one skilled in the art to which the presently disclosed subject matter pertains, when this skilled artisan has the benefit of the teachings currently presented. Therefore, it is to be understood that the presently disclosed subject matter is not to be limited to the specific embodiments disclosed and that modifications and other embodiments are intended to be included within the scope of the appended claims.

Before the present compounds, compositions, systems, and/or methods are disclosed and described, it is to be understood that they are not limited to specific synthetic methods unless otherwise specified, or to particular reagents unless otherwise specified, as such may, of course, vary. It is also to be understood that the terminology used herein is for the purpose of describing particular aspects only and is not intended to be limiting. Although any methods and materials similar or equivalent to those described herein can be used in the practice or testing of the present invention, example methods and materials are now described.

Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is in no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

Throughout this application, various publications are referenced. The disclosures of these publications in their entireties are hereby incorporated by reference into this application in order to more fully describe the state of the art to which this pertains. The references disclosed are also individually and specifically incorporated by reference herein for the material contained in them that is discussed in the sentence in which the reference is relied upon. Nothing herein is to be construed as an admission that the present invention is not entitled to antedate such publication by virtue of prior invention. Further, the dates of publication provided herein may be different from the actual publication dates, which can require independent confirmation.

One reference in particular is Sztaberek, L. et al., "Sol-Gel Synthesis of Ruthenium Oxide Nanowires To Enhance Methanol Oxidation in Supported Platinum Nanoparticle Catalysts," ACS Omega, 2019, 4, 14226-14233. It is noted that this is Applicant's own work, which was published by the Applicant less than one year prior to filing the current application.

Metal oxide supports have been shown to facilitate SOM oxidation on Pt NPs via several mechanisms. For example, oxides improve the three-dimensional dispersion of Pt NPs leading to better Pt utilization (Yang, L. X.; Allen, R. G.; Scott, K.; Christenson, P. A.; Roy, S., Electrochim. Acta 2005, 50, 1217-1223; Thanh Ho, V. T.; Pillai, K. C.; Chou, H.-L.; Pan, C.-J.; Rick, J.; Su, W.-N.; Hwang, B.-J.; Lee, J.-F.; Sheu, H.-S.; Chuang, W.-T., Energy Environ. Sci. 2011, 4, 4194-4200). Analogous to the bifunctional mechanism Ru dopants in $Pt_{1-x}Ru_x$ alloy catalysts, the surfaces of metal oxides can provide oxide species or facilitate the transport of hydroxide species to support CO spillover at the interface between the Pt particle and the oxide surface. (Profeti, L. P. R.; Profeti, D.; Olivi, P., Int. J. Hydrogen Energy 2009, 34, 2747-2757; Huang, H.; Zhu, J.; Li, D.; Shen, C.; Li, M.; Zhang, X.; Jiang, Q.; Zhang, J.; Wu, Y., J. Mater. Chem. A 2017, 5, 4560-4567; An, G.-H.; Lee, E.-H.; Ahn, H.-J., Phys. Chem. Chem. Phys. 2016, 18, 14859-14866). In addition, several reports have shown that oxide supports lead to significant changes of the electronic structure of Pt via the strong metal/support interaction (SMSI) effect. (Moghaddam, R. B.; Pickup, P. G., Electrochem. Commun. 2011, 13, 704-706; Spătaru, T.; Preda, L.; Osiceanu, P.; Munteanu, C.; Marcu, M.; Lete, C.; Spătaru, N.; Fujishima, A., Electrocatalysis 2016, 7, 140-148; Ho, V. T. T.; Nguyen, N. G.; Pan, C.-J.; Cheng, J.-H.; Rick, J.; Su, W.-N.; Lee, J.-F.; Sheu, H.-S.; Hwang, B.-J., Nano Energy 2012, 1, 687-695; Thanh Ho, V. T.; Pillai, K. C.; Chou, H.-L.; Pan, C.-J.; Rick, J.; Su, W.-N.; Hwang, B.-J.; Lee, J.-F.; Sheu, H.-S.; Chuang, W.-T., Energy Environ. Sci. 2011, 4, 4194-4200). The structural interaction between the oxide support and the Pt catalysts leads to significant variations in the d-band vacancy of the Pt NP and can promote either reversible or irreversible oxidation of the Pt depending on the strength of the interaction.

Regardless of the knowledge disclosed in the art, there still exist significant challenges surrounding catalytic activity and stability and there is still an unmet need for new supports that overcome the myriad of issues with the currently used catalysts. One challenge is that most metal oxides are either insulators or semi-conductors, which have low conductivity. This decreases their efficiency as electrocatalysts, since resistive losses become significant. (Yang, L. X.; Allen, R. G.; Christenson, K.; Scott, K.; Christenson, P. A.; Roy, S., *Electrochim. Acta* 2005, 50, 1217-1223; Rolison, D. R.; Hagans, P. L.; Swider, K. E.; Long, J. W., *Langmuir* 1999, 15, 774-779; Spătaru, T.; Preda, L.; Osiceanu, P.; Munteanu, C.; Marcu, M.; Lete, C.; Spătaru, N.; Fujishima, A., *Electrocatalysis* 2016, 7, 140-148; Profeti, L. P. R.; Profeti, D.; Olivi, P., *Int. J. Hydrogen Energy* 2009, 34, 2747-2757; Peng, F.; Zhou, C.; Wang, H.; Yu, H.; Liang, J.; Yang, J., *Catal. Commun.* 2009, 10, 533-537; Huang, H.; Zhu, J.; Li, D.; Shen, C.; Li, M.; Zhang, X.; Jiang, Q.; Zhang, J.; Wu, Y., *J. Mater. Chem. A* 2017, 5, 4560-4567; Pietron, J. J.; Pomfret, M. B.; Chervin, C. N.; Long, J. W.; Rolison, D. R., *J. Mater. Chem.* 2012, 22, 5197-5204; Ho, V. T. T.; Nguyen, N. G.; Pan, C.-J.; Cheng, J.-H.; Rick, J.; Su, W.-N.; Lee, J.-F.; Sheu, H.-S.; Hwang, B.-J., *Nano Energy* 2012, 1, 687-695; Joo, S. H.; Park, J. Y.; Renzas, J. R.; Butcher, D. R.; Huang, W.; Somorjai, G. A., *Nano Lett.* 2010, 10, 2709-2713; Shao, Z.-G.; Zhu, F.; Lin, W.-F.; Christensen, P. A.; Zhang, H., *J. Power Sources* 2006, 161, 813-819; An, G.-H.; Lee, E.-H.; Ahn, H.-J., *Phys. Chem. Chem. Phys.* 2016, 18, 14859-14866; Saida, T.; Sugimoto, W.; Takasu, Y., *Electrochim. Acta* 2010, 55, 857-864; Thanh Ho, V. T.; Pillai, K. C.; Chou, H.-L.; Pan, C.-J.; Rick, J.; Su, W.-N.; Hwang, B.-J.; Lee, J.-F.; Sheu, H.-S.; Chuang, W.-T., *Energy Environ. Sci.* 2011, 4, 4194-4200). Unlike most metal oxides, crystalline ruthenium oxide has a relatively high electrical conductivity, which would alleviate this issue. However, prior accounts have used either amorphous or hydrated ruthenium oxide as support materials, which has a much lower conductivity than crystalline ruthenium oxide. Solutions to these issues are provided in the nanowires of the currently presented subject matter.

A. DEFINITIONS

Listed below are definitions of various terms used to describe this invention. These definitions apply to the terms as they are used throughout this specification, unless otherwise limited in specific instances, either individually or as part of a larger group.

As used in the specification and the appended claims, the singular forms "a," "an," and "the" include plural referents unless the context clearly dictates otherwise.

Ranges can be expressed herein as from "about" one particular value and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed. Further, as used herein, the term "about," when referring to a value, is meant to encompass variations of in some embodiments±20%, in some embodiments±15%, in some embodiments±10%, in some embodiments±5%, in some embodiments±1%, in some embodiments±0.5%, and in some embodiments±0.1% from the specified amount, as such variations are appropriate to perform the disclosed methods or employ the disclosed compositions.

Where a range of values is provided, it is understood that all intervening values, unless the context clearly dictates otherwise, between the upper and lower limit of the range and any other stated or intervening value in that stated range, are encompassed. The upper and lower limits of these small ranges which may independently be included in the smaller rangers is also encompassed, subject to any specifically excluded limit in the stated range. Where the stated range includes one or both of the limits, ranges excluding either or both of those included limits are also included.

As used herein, the term "optional" or "optionally" means that the subsequently described event or circumstance can or cannot occur, and that the description includes instances where said event or circumstance occurs and instances where it does not.

The term "comprising" (and its grammatical variations) as used herein is used in the inclusive sense of "having" or "including" and not in the exclusive sense of "consisting of."

As used herein, the term "nanoparticle" means a particle having all three Cartesian dimensions (e.g. length, width, and height) on the order of nanometers (e.g., between about 1 and 200 nanometers).

As used herein, the term "nanowire" means a nanowire structure having at least two dimensions (e.g. height and width) on the order of nanometers (e.g., between about 1 and 200 nanometers). The third dimension (e.g. length) can vary to lengths greater than 200 nanometers. For example, non-limiting lengths of a nanowire may be 200 nm, 1000 nm (1 μm), or 3000 nm (3 μm).

As used herein, the term "diameter" of a nanowire is measured in an axis perpendicular (i.e. height or width) to the axis of the nanowire's actual length (i.e., perpendicular to the nanowire's backbone). The diameter of a nanowire will vary from narrow to wide as measured at different points along the nanowire backbone. As used herein, the diameter of a nanowire is the most prevalent (i.e., the mode) diameter.

As used herein, the "aspect ratio" of a nanowire is the ratio of the actual length (L) of the nanowire to the diameter (D) of the nanowire. Aspect ratio is expressed as L:D, and an aspect ratio greater than 2:1.

In some embodiments, the nanowire is crystalline in nature. As used herein, the term "crystalline" refers to a solid material where the atoms are arranged in a highly ordered structure forming a crystal lattice. The crystalline nature of a material may be determined using any standard procedure, such as Transition Electron Microscopy (TEM), High Resolution Transmission Electron Microscopy (HRTEM), or Powder X-Ray Diffraction (PXRD). As a non-limiting example, the presence of defined peaks in a PXRD spectrum (as opposed to a broad curve) can denote the presence of a crystalline material.

As used herein, the term "transition metals" refers to elements, which are listed in the "transition metal" section of the periodic table of elements. The "transition metal" section includes elements, which are found in Groups 3-12, where nonlimiting examples include elements such as scandium (Sc), titanium (Ti), ruthenium (Ru), palladium (Pd), and platinum (Pt).

As used herein, the term "lanthanides" refers to elements, which are listed in the "lanthanide" section of the periodic table. These elements include lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), yitterbium (Yb), and lutetium (Lu).

As used herein, the term "actinides" refers to elements, which are listed in the "actinide" section of the periodic table. These elements include actinium (Ac), thorium (Tb), protactinium (Pa), uranium (U), neptunium (Np), plutonium (Pu), americium (Am), curium (Cm), berkelium (Bk), californium (Cf), einsteinium (Es), fermium (Fm), mendelevium (Md), nobelium (No), and lawrencium (Lr).

As used herein, the terms "metal element" or "metal" is any element selected from the transition metals, lanthanides, or actinides section of the periodic table. Metals include metal elements in their elemental form as well as metal elements in an oxidized or reduced state, for example, when a metal element is combined with other elements. For example, when metals are combined with oxygen, the product may be referred to as a "metal oxide." Other nonlimiting examples are metal elements that can be in the form of hydrates, salts, and various polymorphs.

As used herein, the term "metal oxide" refers to a metal compound that also comprises oxygen. Examples of "metal oxides" include, but are not limited to, metal oxides ($M_xO_y$), metal hydroxides ($M_x(OH)_y$), metal oxyhydroxides ($M_xO_y(OH)_z$), metal oxyhalide ($M_xO_yX_z$) where X is fluoride, chloride, bromide, or iodide, metal oxynitrates ($M_xO_y(NO_3)_z$), metal phosphates ($M_x(PO_4)_y$), metal oxide carbonates ($M_xO_y(CO_3)$), metal carbonates ($M_x(CO_3)_y$), and the like, wherein x, y, and z are numbers from 1 to 100.

As used herein, the term "catalytic metal" refers to a metal, which functions as a catalyst in a catalytic reaction. The "catalytic metal" may comprise any metal element selected from the transition metals, lanthanides, or actinides section of the periodic table.

As used herein, the term "catalyst" refers to a substance, which alters the rate of a chemical reaction. As used herein, the "catalyst" comprises a "catalytic metal" supported by a "nanowire" to form the full "catalyst." Additional descriptions of the "catalyst" are provided herein.

A catalyst may either increase the chemical reaction rate (i.e., a "positive catalyst") or decrease the reaction rate (i.e., a "negative catalyst"). Catalysts participate in a reaction in a cyclic fashion such that the catalyst is cyclically regenerated. "Catalytic" means having the properties of a catalyst. In one embodiment, the catalytic activity is such that the conversion of reactant to product in the chemical reaction is greater than the conversion compared to the same reaction under the same conditions but performed without a catalyst. The catalyst may facilitate conversion of reactant to product at a rate that is from 1.1 to 1,000,000 times faster when compared to the conversion of reactant to product without a catalyst. In another embodiment, the reaction rates of two different catalysts may be compared. For example, the reaction rate of a Pt NP/RuO$_2$ NW catalyst and the reaction rate of a Pt NP/C catalyst may be compared.

An effect often seen in chemical reactions using catalysts is an effect called "poisoning." As used herein, the term "poison" or "poisoning" refers to an effect wherein a molecule renders the catalyst less effective with respect to activity than when it is not poisoned. In an embodiment, the effective activity of the catalyst is reduced by at least 10%, at least 20%, at least 30%, at least 40%, at least 50%, at least 60%, at least 70%, at least 80%, or at least 90%, when compared to a non-poisoned catalyst. The actual "poison" is not particularly limited. In the context of a SOM oxidation reaction, the poison may be a partially oxidized organic molecule.

As used herein, the term "partially oxidized organic molecule" refers to any organic molecule, which is an oxidation product of an oxidation reaction.

The term "contacting" as used herein refers to bringing a disclosed compound, reagent, reactant, solvent, or the like together with another compound, reagent, reactant, solvent, or the like.

Compounds described herein comprise atoms in both their natural isotopic abundance and in non-natural abundance. The disclosed compounds can be isotopically labeled or isotopically substituted compounds identical to those described, but for the fact that one or more atoms are replaced by an atom having an atomic mass or mass number different from the atomic mass or mass number typically found in nature. Examples of isotopes that can be incorporated into compounds of the invention include isotopes of hydrogen, carbon, nitrogen, oxygen, phosphorous, fluorine, and chlorine, such as $^2H$, $^3H$, $^{13}C$, $^{14}C$, $^{15}N$, $^{18}O$, $^{17}O$, $^{35}S$, $^{18}F$ and $^{36}Cl$, respectively. Isotopically labeled compounds of the present invention can generally be prepared by carrying out the procedures below, by substituting a readily available isotopically labeled reagent for a non-isotopically labeled reagent.

The compounds described in the invention can be present as a solvate. "Solvates" refers to the compound formed by the interaction of a solvent and a solute and includes hydrates. Solvates are usually crystalline solid adducts containing solvent molecules within the crystal structure, in either stoichiometric or nonstoichiometric proportions. In some cases, the solvent used to prepare the solvate is an aqueous solution, and the solvate is then often referred to as a hydrate. The compounds can be present as a hydrate, which can be obtained, for example, by crystallization from a solvent or from aqueous solution. In this connection, one, two, three, or any arbitrary number of solvate or water molecules can combine with the compounds according to the invention to form solvates and hydrates. Unless stated to the contrary, the invention includes all such possible solvates.

As used herein, a "sol-gel" process is a method for producing solid materials from small molecules. The method is often used for fabrication of metal oxides, such as silicon and titanium oxides. The method involves conversion of monomers into a colloidal solution ("sol") that acts as the precursor for an integrated network ("gel") of either discrete particles or network polymers.

The sol-gel method described herein may use a "metal sol" in the method. As used herein, the term "metal sol" refers to a metal in the sol form. The type of metal or salt form of the metal is not particularly limited. For example, a metal sol may be a metal halide sol, metal hydroxide, metal oxide, or a metal acetate sol.

The sol-gel method described herein may use a "gelling agent" in the method. As used herein, the term "gelling agent" refers to an agent, which is added to the precursor sol to initiate gelation. Non-limiting examples of gelling agents are water soluble chemicals such as alcohols (e.g., ethanol, ethylene glycol,), salts (e.g., β-Glycerophosphate disodium hydrate or pentahydrate, sodium pyrophosphate tetrabasic, or potassium phosphate dibasic trihydrate), epoxides (e.g., propylene oxide, or propylene oxide vapors), aldehydes (e.g., methyl formate), amines (e.g., primary amines, secondary amines, or tertiary amines—such as 1-2-aminoethyl) piperazine, diethylenetriamine (DETA), ethylenediamine (EDA), hexamethylenetetramine (HMTA), N,N'-dimethylethylenediamine (DMEDA), hexamethylenediamine (HMDA), tris(2-aminoethyl)amine (STAR), ethanolamine, propanolamine, and (1-2-aminoethyl)piperazine. In an embodiment, the gelling agent is propylene oxide vapors.

References in the specification and concluding claims to parts by weight of a particular element or component in a composition denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent (wt. %) of a component, unless specifically stated to the contrary, is based on the total weight of the formulation or composition in which the component is included.

It is known that chemical substances form solids, which are present in different states of order which are termed polymorphic forms or modifications. The different modifications of a polymorphic substance can differ greatly in their physical properties. The compounds according to the invention can be present in different polymorphic forms, with it being possible for particular modifications to be metastable. Unless stated to the contrary, the invention includes all such possible polymorphic forms.

B. NANOWIRES

The oxidation of SOMs has broad applications in fuel cells, catalysis, and sensors. However, the practical development of catalysts for these reactions is hindered by the poisoning effects of partially oxidized carbon species. Traditional strategies for improving SOM oxidation on carbon-supported Pt-based catalysts have focused largely on tuning the properties of the Pt catalyst itself. However, tuning the physicochemical properties of the support material represents a second and equally important pathway for reducing the effects of poisoning in SOM oxidation catalysts. Disclosed herein are crystalline metal oxide nanowires useful as a support material for metal catalysts, especially when considering the high conductivity and beneficial surface properties of the nanowires.

From a broader perspective, the disclosures contained herein provide further evidence that support materials can not only contribute to new active sites for SOM oxidation but also influence the nature of the catalyst itself through the strong interactions between the catalyst and its support.

The nanowires may be composed of various materials. In one embodiment, the nanowires comprise one or more elements from any of the transition metals, lanthanides, actinides, or combinations thereof. In some embodiments, the elements may form metal oxides.

In certain examples, metal oxides may be hygroscopic and may change forms once exposed to air. Accordingly, although the nanowires are often referred to as metal oxides; in certain embodiments, the nanowires also comprise hydrated oxides, oxyhydroxides, hydroxides, or combinations thereof.

In some embodiments, the nanowires comprise metal oxides, where nonlimiting examples include: $RuO_2$, $Cr_2O_3$, $CoO$, $NiO$, $Fe_2O_3$, $MnO_2$, $V_2O_3$, $CuO$, $WO_2$, $TiO_2$, $MgO$, $CaO$, $La_2O_3$, $Mn_2O_3$, $Sm_2O_3$, $Eu_2O_3$, $Pr_2O_3$, and combinations thereof. As used herein, the term "metal oxide" refers to a metal compound that also comprises oxygen.

Among the wide range of metal oxides, ruthenium oxide has a comparably high conductivity and its surface is hydrated in acidic media leading to the presence of catalytic beneficial hydroxyl species. Literature reports focus on hydrous ruthenium oxide, which is not crystalline and has varying stoichiometry depending upon the reaction conditions. As discussed further herein, hydrous $RuO_2$ leads to enhanced SOM oxidation performance in Pt but is less conductive than crystalline $RuO_2$ and the strong SMSI effect associated with hydrous $RuO_2$ leads to partial irreversible oxidation of the Pt surface.

As disclosed herein, in an embodiment, is a nanowire comprising a metal oxide wherein the nanowire has a diameter from about 1 nm to about 300 nm as measured by TEM, wherein
    the nanowire is crystalline, and
    the metal oxide comprises one or more elements from the groups selected from transition metals, lanthanides, actinides, and combinations thereof, provided the element may chemically form an oxide.

As in any above embodiment, a nanowire wherein the metal oxide is selected from the group consisting of $RuO_2$, $Cr_2O_3$, $CoO$, $NiO$, $Fe_2O_3$, $MnO_2$, $V_2O_3$, $CuO$, $WO_2$, $TiO_2$, $MgO$, $CaO$, $La_2O_3$, $Mn_2O_3$, $Sm_2O_3$, $Eu_2O_3$, $Pr_2O_3$, and combinations thereof.

As in any above embodiment, a nanowire wherein the metal oxide is $RuO_2$.

As in any above embodiment, a nanowire wherein the nanowire has a length from about 0.05 μm to about 3 μm.

As in any above embodiment, a nanowire wherein the nanowire does not have a surface coating.

As in any above embodiment, a nanowire wherein the nanowire has a solid core.

As in any above embodiment, a nanowire wherein the nanowire further comprises less than about 50% metallic ruthenium. In an embodiment, the nanowire comprises less than about 40% metallic ruthenium, less than about 30% metallic ruthenium, less than about 20% metallic ruthenium, less than about 10% metallic ruthenium, less than about 5% metallic ruthenium, or less than about 2% metallic ruthenium. In an embodiment, the nanowire comprises between about 1% to about 5% metallic ruthenium, about 5% to about 10% metallic ruthenium, about 10% to about 20% metallic ruthenium, about 20% to about 30% metallic ruthenium, about 30% to about 40% metallic ruthenium, or about 40% to about 50% metallic ruthenium.

In an embodiment, when metallic ruthenium is present, the metallic ruthenium can form an alloy with the catalytic metal. In an embodiment, the metallic ruthenium and catalytic metal alloy improve the properties of the catalyst. Alloys of metallic platinum and ruthenium are more catalytically active toward the oxidation of small organic molecules because metallic ruthenium is more oxophilic. During the oxidation process, surface ruthenium sites are more easily oxidized than Pt sites forming surface hydroxide species, which facilitate the oxidation and removal of poisoning species such as partially oxidizing intermediates.

a. Synthesis of Nanowires

In some embodiments, the nanowires can be synthesized in a solution phase in the presence of a template. Typically, a hydrothermal or sol-gel approach can be used to create the crystalline nanowires. As an example, nanowires comprising a metal oxide can be prepared by 1) filling a porous substrate with a metal salt, 2) adding a gelling agent, and 3) isolating the nanowire.

Figure 8A:
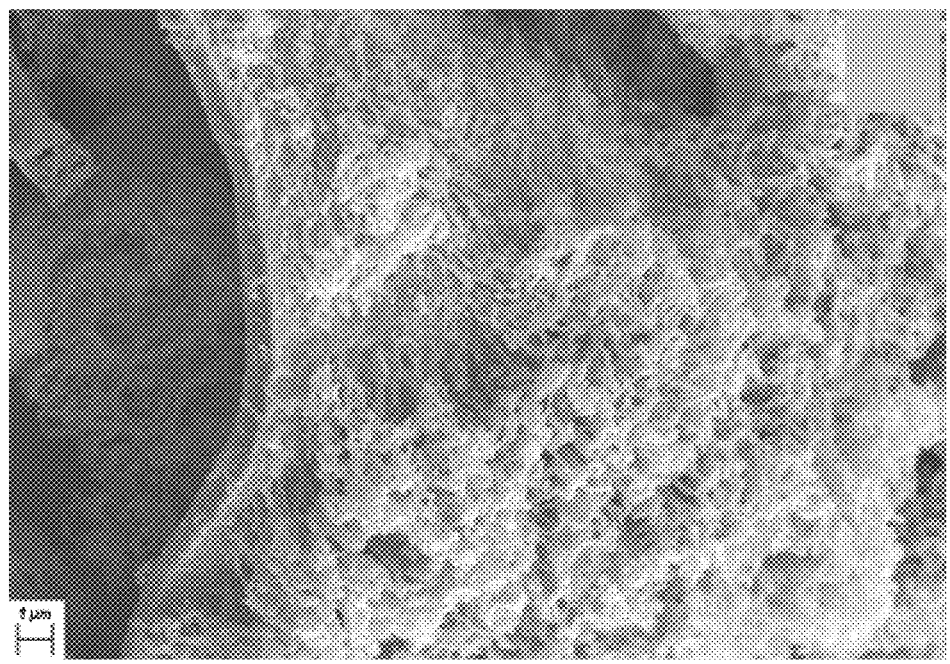
FIGS. 8A and 8B show a SEM image of a $RuO_2$ sample prepared using the traditional sol-gel method and then polishing the template (FIG. 8A) and a SEM image of a $RuO_2$ sample produced by washing the template with a small amount of ethanol to remove the sol-gel reaction from the surface of the template (FIG. 8B).
Figure 8B:
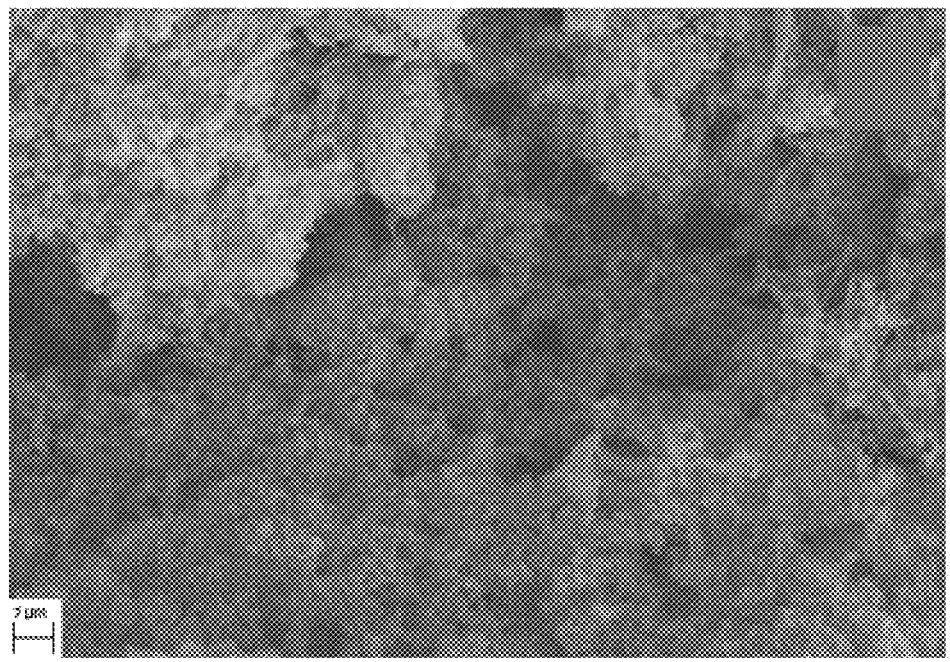

Vacuum filtration is usually effective at filling the pores of a template such as anodic alumina and polycarbonate filter membranes. In prior reports, a standard procedure was used wherein the gelling agent was added to the precursor sol to initiate gelation before the template pores were impregnated. The pre-formed gel is then introduced into the template pores by vacuum filtration. There are several challenges that arise when attempting to synthesize metal oxide nanowires via this process. First, the standard approach leads to the formation of a thin layer of bulk material on the surface of the template (FIG. 8A) that was impossible to remove before annealing via washing the template (FIG. 8B) or after annealing by polishing the template. Both of these approaches (i.e. washing and polishing) led to a loss of the desired one-dimensional, nanowire morphology. As detailed further herein, a method was devised which overcame the problems associated with the standard procedure. This method provided metal oxide nanowires without the undesired thin layer of bulk material on the surface.

In one aspect, disclosed are methods of making metal oxide nanowires. In some embodiments, the procedures may be used in preparing nanowires from $RuO_2$, $Cr_2O_3$, CoO, NiO, $Fe_2O_3$, $MnO_2$, $V_2O_3$, CuO, $WO_2$, $TiO_2$, MgO, CaO, $La_2O_3$, $Mn_2O_3$, $Sm_2O_3$, $Eu_2O_3$, and $Pr_2O_3$. In some embodiments, such methods are used to prepare crystalline $RuO_2$ nanowires.

The synthesis of the $RuO_2$ nanowires disclosed herein was accomplished via a new method, namely a template-assisted sol-gel technique. This two-step approach was developed to prepare uniform nanowires without the presence of excess bulk material that is typically formed on the surface of the template. This technique is also different from the standard approach because the gelation reaction occurs directly within the template pores. The template is first loaded with a sol and subsequently, the gelling agent is introduced into the pores resulting the sol-gel reaction. Performing the sol-gel reaction inside the pores has several advantages. First, this process avoids the formation of the thin layer of bulk material that is formed on the surface of the template. Second, loading the template pores with the sol allows for the density of the material within the pore to be controlled. Third, the morphology of the sol-gel is directly controlled by the template, which prevents the formation of products with undesirable morphology.

In the first step of this method, a polycarbonate filter membrane with a nominal pore diameter of 200 nm was impregnated with a $RuCl_3$ sol by vacuum filtration. An ethanol solution was loaded into the template and the surface was polished to remove ruthenium residues while leaving the precursor in the pores undisturbed. The gelation process was initiated inside of template pores by exposing the saturated template to propylene oxide vapors in a glass reactor. The color of the template immediately began to change from a brownish-red color to jet-black once exposed to the vapors of propylene oxide. This color change indicated that the gelation reaction between the $RuCl_3$ contained within the pores and the propylene oxide. The reaction proceeded for several minutes to allow for the penetration of the vapors into the template pores.

Figure 1B:
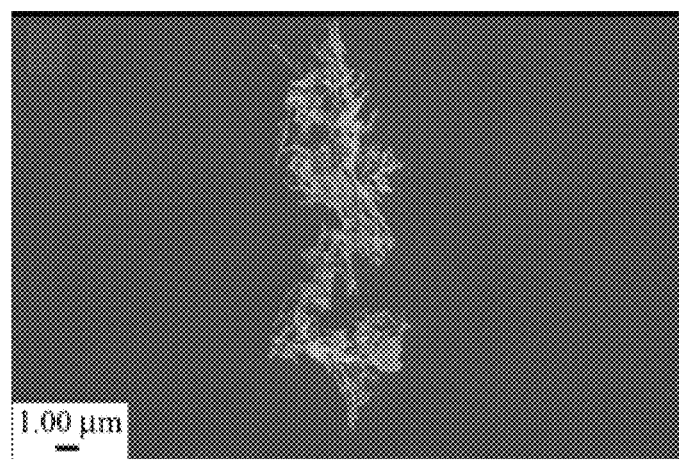

To convert the sol-gel into crystalline $RuO_2$, the template was annealed at 600° C. for 30 minutes. This heating step also resulted in the vaporization of the polycarbonate, thus alleviating the need for further processing. Scanning electron microscopy of the resulting powder (FIG. 1) revealed that the material consisted almost entirely of well-dispersed, one-dimensional, nanowire structures, with only a small fraction of the material consisting of NPs. The diameter of the nanowires was determined to be 128±15 nm with lengths of up to 3 µm. The measured diameter is ~70 nm smaller than the nominal diameter of the 200 nm pore dimensions. The smaller size of the nanowires relative to the template pore diameter can be explained by the removal of the organic species and densification of the structures during crystallization, which has been observed previously.

As disclosed herein, in an embodiment is a method of preparing a nanowire described herein, the method comprising:
a) impregnating, by vacuum filtration, a polycarbonate filter membrane with a metal sol, wherein the polycarbonate filter membrane has a nominal pore diameter of about 200 nm;
b) loading an ethanol solution onto a template;
c) polishing the surface of the impregnated filter membrane;
d) exposing the polished impregnated filter membrane from step c) to a gelling agent;
e) annealing the impregnated filter membrane from step d) at an elevated temperature for a period of time; and
f) isolating the nanowire of claim 1.

As in any above embodiment, a method wherein the metal halide is $RuCl_3$.

As in any above embodiment, a method wherein the elevated temperature is from about 300° C. to about 800° C. In an embodiment, the elevated temperature is from about 400° C. to about 750° C., 500° C. to about 700° C., or about 550° C. to about 650° C. In an embodiment, the elevated temperature is about 300° C., 350° C., 400° C., 450° C., 500° C., 550° C., 600° C., 650° C., 700° C., 750° C., or 800° C. In an embodiment, the elevated temperature is at least about 300° C., at least about 400° C., at least about 500° C., at least about 600° C., or at least about 700° C. In an embodiment, the temperature is about 600° C., As in any above embodiment, a method wherein the period of time is from about 10 minutes to about 300 minutes. In an embodiment, the period of time is from about 15 minutes to about 45 minutes, or about 30 minutes. In an embodiment, the period of time is less than about 300 minutes, less than about 240 minutes, less than about 180 minutes, less than about 120 minutes, less than about 60 minutes, less than about 45 minutes, less than about 30 minutes, or less than about 15 minutes.

b. Characterization of the Nanowires

Figure 2:
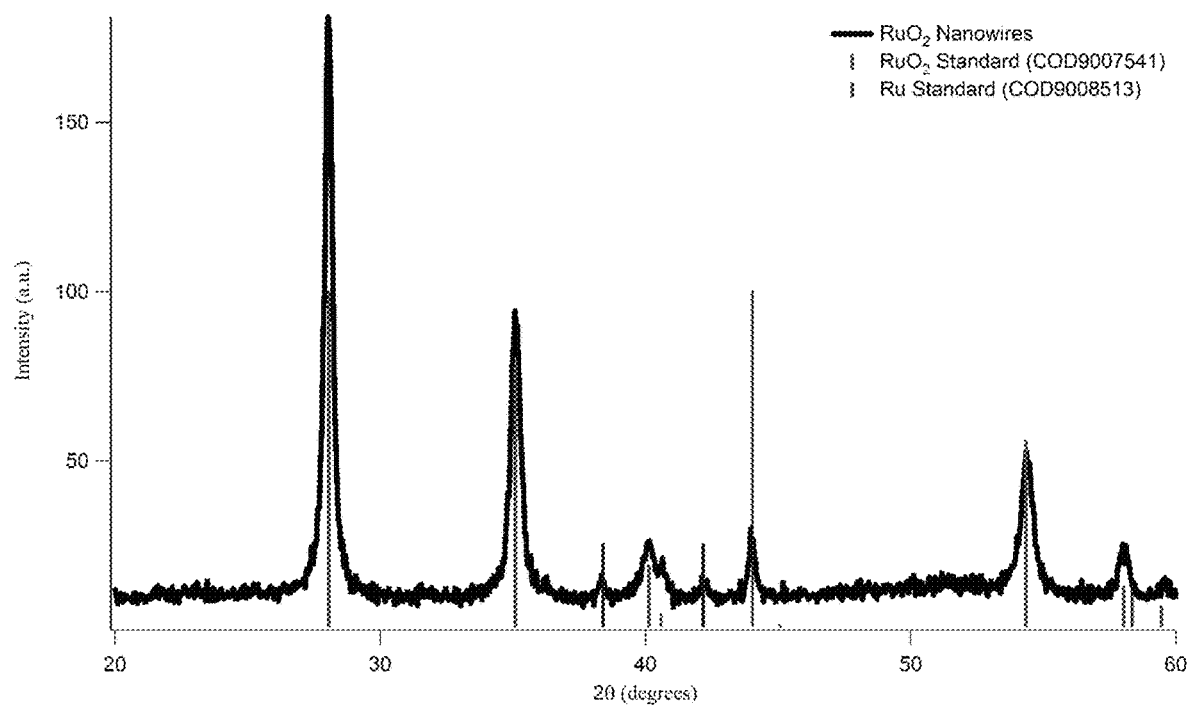
FIG. 2 shows a powder XRD pattern of the $RuO_2$ nanomaterial showing that the major phase of the material is $RuO_2$ (red lines, COD 9007541) with a small quantity of metallic Ru (blue lines, COD 9008513).

Powder XRD was performed to characterize the crystallinity and structure of the $RuO_2$ nanowires. The diffraction pattern (FIG. 2) shows distinct peaks that can be indexed to crystalline, tetragonal $RuO_2$, with unit cell parameters of a=4.49 Å and c=3.11 Å. For comparison, also provided are the relative peak positions and intensities of pure ruthenium oxide obtained from the Open Crystallographic Database (card number 9007541) in Table 1. This is in contrast to prior reports, where characterization of hydrous $RuO_2$, $RuO_2 \cdot xH_2O$, by XRD yielded broad, undefined peaks consistent with the amorphous nature of the hydrated material (Dmowski, W.; Egami, T.; Swider-Lyons, K. E.; Love, C. T.; Rolison, D. R., J. Phys. Chem. B 2002, 106, 12677-12683; McKeown, D. A.; Hagans, P. L.; Carette, L. P. L.; Russell, A. E.; Swider, K. E.; Rolison, D. R., J. Phys. Chem. B 1999, 103, 4825-4832.). Temperatures of 400° C. or higher are necessary to fully crystallize $RuO_2$ producing well-defined diffraction peaks. In one embodiment, heat treatment at 600° C. was employed to crystallize the $RuO_2$ nanowires. The crystalline $RuO_2$ nanowires thus obtained provided the well-defined peaks observed in the XRD pattern in FIG. 2 which has following peaks: 2 theta degree of 28.0 with intensity (counts) of 169.07; 2 theta degree of 35.1 with intensity (counts) of 85.39; 2 theta degree of 38.4 with intensity (counts) of 8.09; 2 theta degree of 40.0 with intensity (counts) of 17.08; 2 theta degree of 40.5 with intensity (counts) of 12.80; 2 theta degree of 42.2 with intensity (counts) of 7.68; 2 theta degree of 44.0 with intensity (counts) of 20.90; 2 theta degree of 45.1 with intensity (counts) of 5.12; 2 theta degree of 54.1 with intensity (counts) of 40.56; 2 theta degree of 58.0 with intensity (counts) of 14.09; 2 theta degree of 59.6 with intensity (counts) of 6.83. In addition to crystalline $RuO_2$, there is also a small quantity of crystalline hexagonal Ru, which indicates that a small fraction of the $RuCl_3$ at the core of the wires was not exposed to the propylene oxide vapors. For comparison, lso provided are the relative peak positions and intensities of pure ruthenium obtained from the Open Crystallographic Database (card number 9008513) in Table 2. The presence of Ru may have key benefits in terms of catalysis since it can react with the Pt precursor during the Pt NP deposition step leading to the formation of Pt—Ru alloy nanoparticles.

TABLE 1

Peak positions and intensities for pure, crystalline $RuO_2$.

| Peak Position (Degrees 2 Theta) | Relative Intensity |
|---|---|
| 28.309 | 100.0 |
| 35.094 | 78.1 |
| 40.071 | 19.2 |
| 40.577 | 4.7 |
| 45.045 | 1.5 |
| 54.236 | 55.7 |
| 57.959 | 12.9 |
| 59.498 | 7.0 |

TABLE 2

Peak positions and intensities for pure, crystalline Ru.

| Peak Position (Degrees 2 Theta) | Relative Intensity |
|---|---|
| 38.385 | 40.0 |
| 42.151 | 35.0 |
| 44.000 | 100.0 |
| 58.320 | 25.0 |

In an embodiment, the nanowires comprise a solid core. In another embodiment, the core of the nanowire further comprises metallic ruthenium. In a further embodiment, the metallic ruthenium is hexagonal ruthenium. In an embodiment, the surface of the nanowire does not comprise metallic ruthenium.

Figure 3A:
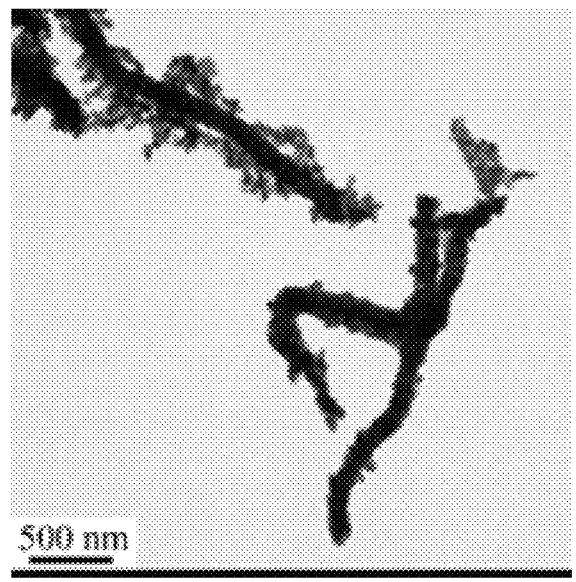
FIGS. 3A-3C show (FIG. 3A) a transmission electron microscope (TEM) image of a $RuO_2$ nanomaterial, revealing the filled, polycrystalline nanowire structure.

High resolution TEM was performed to examine the microstructure of the $RuO_2$ nanowires. The nanowire morphology is evident in FIG. 3A and it was confirmed that the one-dimensional structures were solid nanowires and not hollow nanotubes. The size of the nanowires measured from the TEM images is 139±19 nm, which is in agreement with the measurements from the SEM. It is evident from the TEM images that the nanowires are comprised of interconnected crystalline domains with a diameter of ~25 nm. A "polycrystalline" material is one which is made up of many crystalline domains. In the sol-gel synthesis, the initially formed sol consists of many particles, which coalese into a three-dimensional network upon gelation. The shape of the three-dimensional network is confined to that of a nanowire by the template pore. During annealing, the individual particles within the gel network are crystallized forming interconnected crystalline domains that comprise the overall nanowire.

Further, the nanowires produced have no surface coatings as a result of surfactants or residual templating materials. This allows for direct contact between the catalyst nanoparticles and the $RuO_2$ surface. Direct contact is beneficial for catalysts because it allows for new active sites to be created at the interface between the support and the catalyst metal such as oxide or hydroxide species, which can facilitate organic molecule oxidation. In addition, the electronic properties of catalyst metals can be modified by the support leading to increased catalytic activity of the catalyst metal.

The length of nanowires disclosed herein may vary. For example in some embodiments, the nanowires have a length of between 100 nm and 5 µm, between 500 nm and 4.5 µm, between 1 µm and 4 µm, or between 2 µm and 3.5 µm. In other embodiments, the nanowires have a length greater than about 0.5 µm, greater than about 1 µm, or greater than about 2 µm. In some embodiments, the nanowires have a length of about 0.5 µm, 1 µm, 1.5 µm, 2 µm, 2.5 µm, 3 µm, 3.5 µm, 4 µm, 4.5 µm, or 5 µm. As described herein, the length of the nanowires may be determined by TEM or SEM.

The diameter of the nanowires may be different at different points along the nanowire backbone. However, the nanowires comprise a mode diameter (i.e., the most frequently occurring diameter). As used herein, the diameter of a nanowire refers to the mode diameter. In some embodiments, the nanowires have a diameter of between about 1 nm to about 300 nm, about 50 nm to about 250 nm, about 100 nm to about 200 nm, or about 110 nm to about 160 nm. In some embodiments, the diameter is less than about 300 nm, less than about 200 nm, less than about 150 nm, less than about 100 nm, less than about 50 nm, less than about 25 nm, or less than about 10 nm. In some embodiments, the diameter is greater than about 50 nm, greater than about 75 nm, greater than about 100 nm, greater than about 150 nm, greater than about 200 nm, or greater than about 250 nm. As described herein, the diameter of the nanowires may be determined by TEM or SEM.

In an embodiment, the nanowires have a uniform diameter. A uniform diameter is one which variations in the measured diameter are less than about 20% of the mode diameter, less than about 15% of the mode diameter, less than about 10% of the mode diameter, or less than about 5% of the mode diameter. For example, a uniform diameter is a diameter of 128±15 nm.

Various embodiments of the present disclosure provide nanowires having different aspect ratios. In some embodiments, the nanowires have an aspect ratio of greater than 2:1, greater than 5:1, greater than 10:1, greater than 20:1, or greater than 50:1.

C. CATALYSTS a. Types of Catalysts

Catalysts are often used either in their pure form or blended with inert materials, such as silica, alumina, etc. The blending with inert materials is used in order to reduce and/or control large temperature non-uniformities within the reactor bed often observed in the case of strongly exothermic (or endothermic) reactions. In the case of complex multistep reactions, typical blending materials can selectively slow down or quench one or more of the reactions of the system and promote unwanted side reactions. In certain aspects, the present disclosure provides a catalytic material, which solves these problems typically associated with catalyst support material. Accordingly, in certain embodiments, the catalytic activity of the catalytic material can be tuned by blending the catalyst with support materials as described herein, i.e., blending with the nanowires described herein. Thus, the blended catalytic material may comprise a metal oxide nanowire as described herein and a bulk catalyst material.

The catalyst may be chosen depending on the type of reaction that requires catalysis. Such reactions include the oxidation of small organic molecules, such as methanol or formic acid. Catalysts suitable for such reactions, as described herein, comprise a catalytic metal supported by a nanowire. Catalytic metals useful for such reactions include those from the transition metal section of the periodic table, which include as a nonlimiting example, Pt, Ru, Au, Ag, Os, Co, Ni, Cu, Fe and Ir.

As discussed herein, Pt is used to oxidize small organic molecules. However, there are drawbacks associated with this reaction. As an example, oxidation of SOMs on Pt requires high overpotentials because of catalyst poisoning effects, such as from CO. One approach for overcoming the challenge of CO poisoning is to alloy Pt with oxophilic metals such as Ru to promote a bifunctional mechanism. In these alloys, the Ru sites adsorb oxide species at lower potentials than Pt and facilitate the oxidation of CO through a process referred to as CO spillover.

In one embodiment, the catalyst is a blend of a catalytic metal and a metal oxide nanowire. In another embodiment, there are catalysts comprising a plurality of nanowires and a catalytic metal. In certain embodiments, the metal oxide nanowires are supports for the catalytic metal.

In some embodiments, the support is catalytically active. In other embodiments, the support is not catalytically active. In other embodiments, the nanowires may serve as a support for another nanostructure (e.g. nanowire, nanotube, nanoplate, nanobelt) or assembly of nanostructures.

b. Synthesis of the Catalysts

Metal catalysts may be loaded onto the surface of a metal oxide nanowire using a solution-based process and a reducing agent.

Figure 3B:
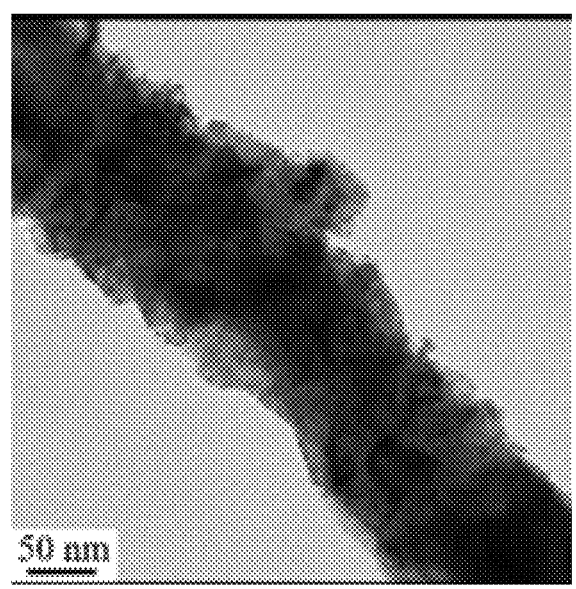
Figure 3C:
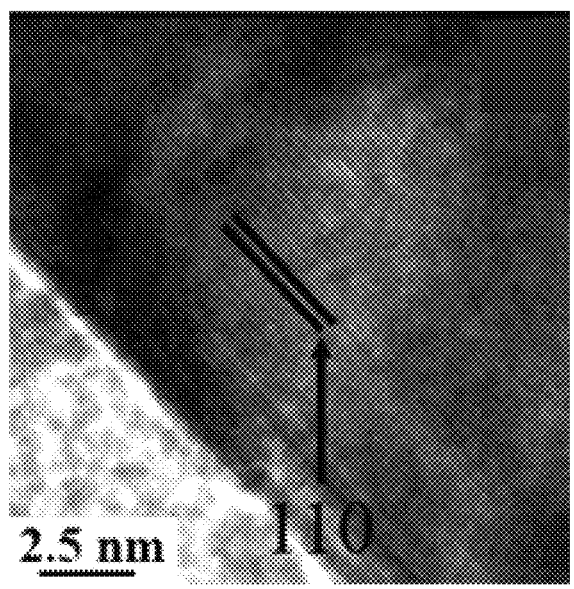
Figure 9:
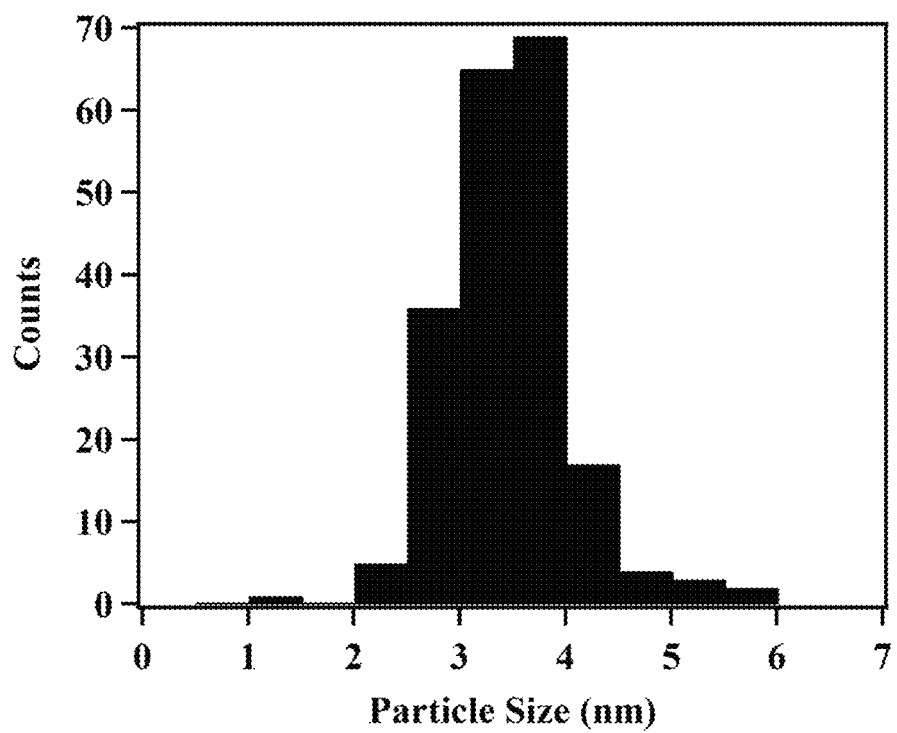
FIG. 9 shows a histogram of Pt NP size on $RuO_2$ NWs.
Figure 10A:
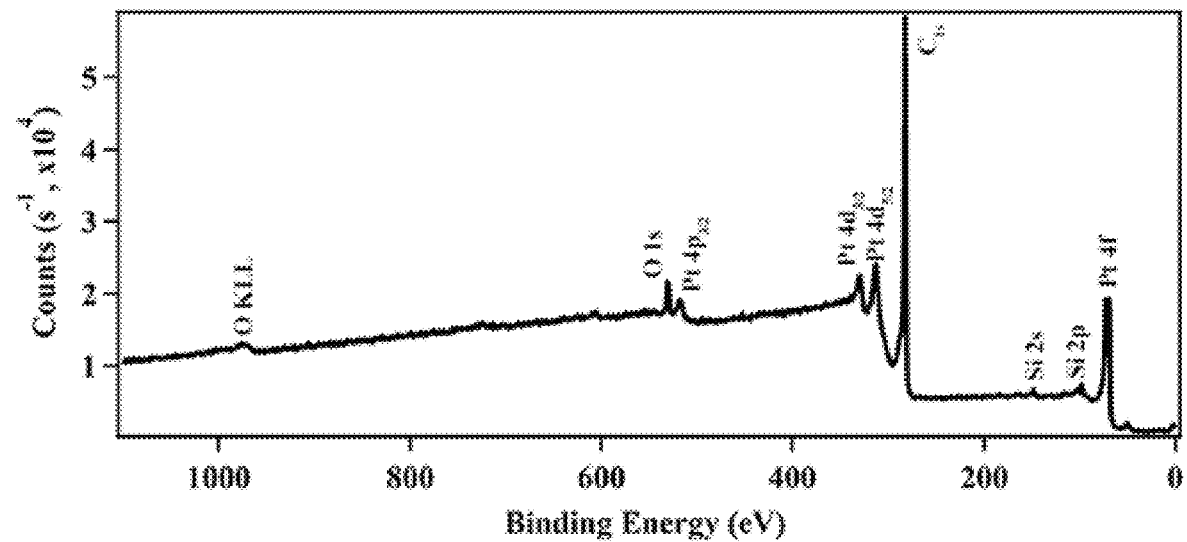
FIGS. 10A and 10B show survey XPS spectra collected from Pt NP/C (FIG. 10A) and Pt NP/$RuO_2$ NWs (FIG. 10B).
Figure 10B:
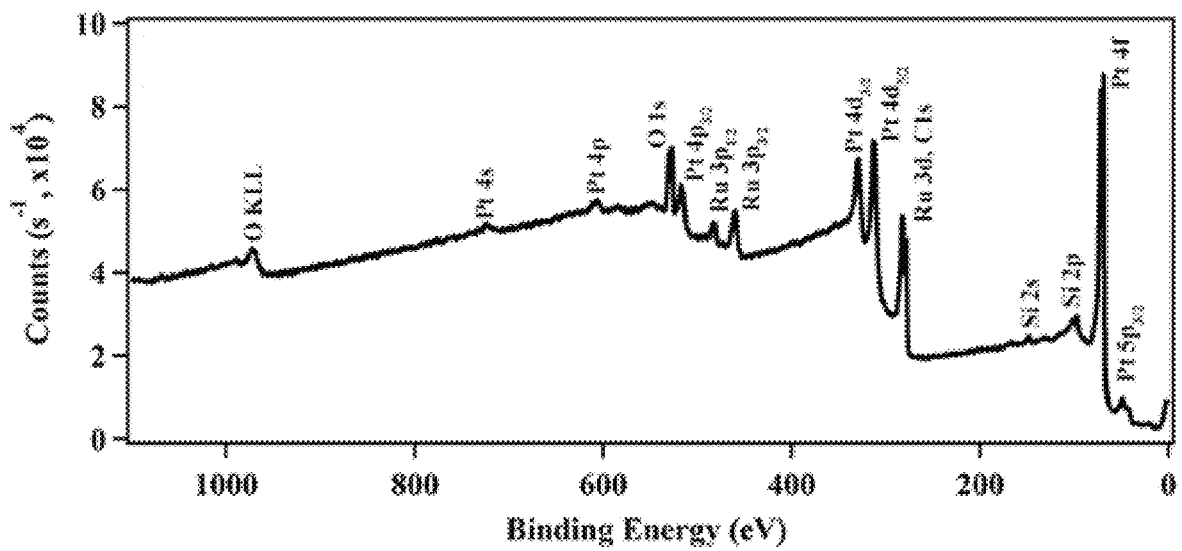

In an embodiment, platinum nanoparticles were loaded onto the surface of $RuO_2$ nanowires via a solution-based reduction process using sodium borohydride as a reducing agent. This resulted in the production of well-dispersed Pt NPs on the surface of the nanowires. HR-TEM images after Pt NP deposition (FIG. 3B) confirmed the high degree of dispersion and revealed that the Pt NPs have an average size of 3.3±0.7 nm (FIG. 9). It can also be seen from high-resolution images that the nanoparticles dispersed on the surface of the nanowires are in intimate contact with the $RuO_2$ nanowire. Additionally, the {010} planes of the $RuO_2$ nanowire are clearly visible, confirming that the $RuO_2$ nanowires are comprised of individual, highly crystalline nanoparticles (FIG. 3C).

c. Characterization of the Catalysts

Figure 4A:
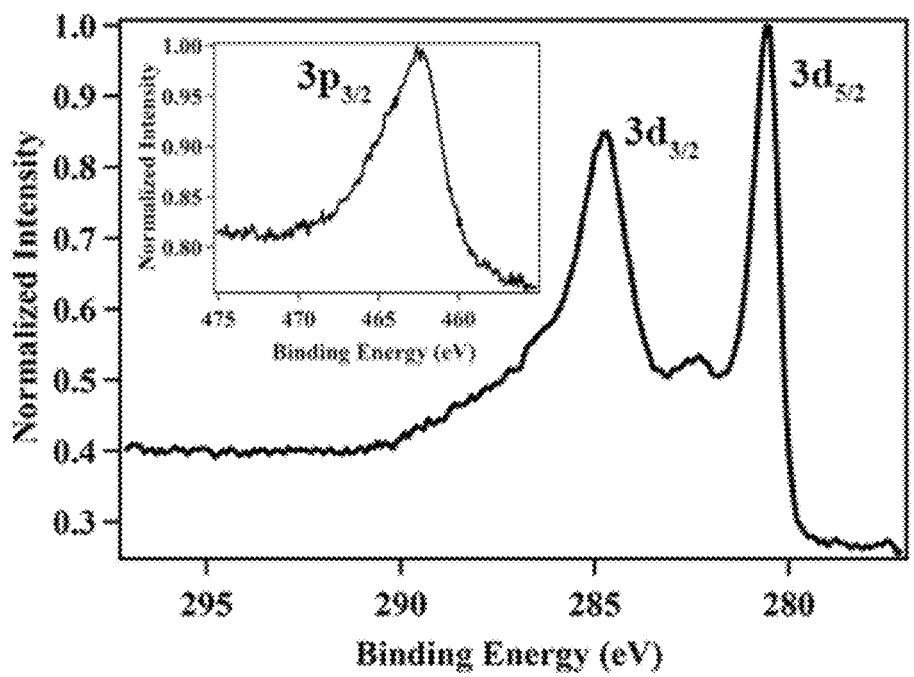
FIGS. 4A and 4B show high-resolution X-ray photoelectron spectroscopy (XPS) scans of the 3d and 3p (inset) Ru peaks (FIG. 4A) in the Pt NP/$RuO_2$ NW catalyst; and high-resolution XPS scans of the Pt 4f peaks (FIG. 4B) of the Pt NPs supported on the $RuO_2$ NW and carbon supports.
Figure 4B:
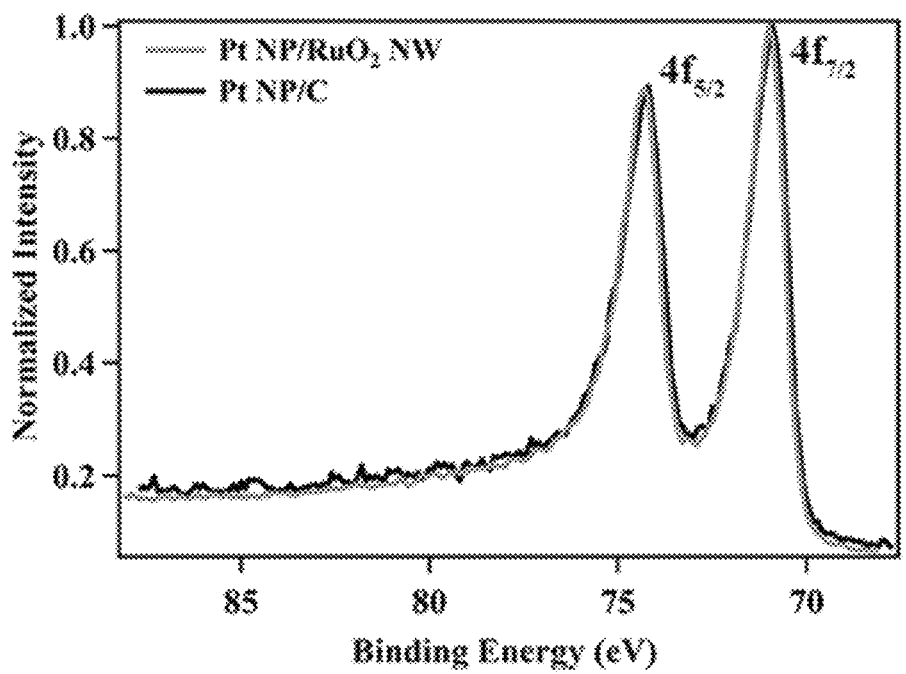

XPS was performed to examine the electronic properties of the Pt catalyst and the support materials. (Qadir, K.; Joo, S. H.; Mun, B. S.; Butcher, D. R.; Renzas, J. R.; Aksoy, F.; Liu, Z.; Somorjai, G. A.; Park, J. Y., *Nano Lett.* 2012, 12, 5761-5768; Qadir, K.; Kim, S. M.; Seo, H.; Mun, B. S.; Akgul, F. A.; Liu, Z.; Park, J. Y., *J. Phys. Chem. C* 2013, 117, 13108-13113). Survey spectra (FIGS. 8A and 8B) collected from the Pt NP/$RuO_2$ NW and Pt NP/C samples confirm the presence of metallic Pt on both substrates with a nominal loading of 20%. Fits of the high-resolution scans of the Ru peaks shown in FIG. 4A reveal that the Ru $3d_{5/2}$, $3d_{3/2}$, and $3p_{3/2}$ peaks are located at 280.9 eV, 285.1 eV, and 463 eV, respectively, and can be assigned to the +4 oxidation state of ruthenium. (Morgan, D. J., *Surf Interface Anal.* 2015, 47, 1072-1079). The sharp cutoff of the Ru $3d_{5/2}$ peak shows that the metallic ruthenium observed in the XRD is relegated to the core of the material since it is not detectable by XPS. To examine the effect of the substrate on the electronic properties of the Pt catalyst, high-resolution scans were obtained of the Pt 4f peaks (FIG. 4B). In both cases, the Pt $4f_{7/2}$ and Pt $4f_{5/2}$ peaks were located at 71.3 eV and 74.7 eV, respectively, consistent with metallic platinum. (Sen, F.; Gökağaç, G., *J. Phys. Chem. C* 2007, 111, 5715-5720). The absence of a measureable shift in the Pt 4f peaks to higher binding energies shows that the crystalline $RuO_2$ support does not contribute to oxidation of the Pt surface. This result contrasts with those of hydrous ruthenium oxide supports, which result in a shift in the peaks and measurable oxidation of the Pt surface. (Spătaru, T.; Preda, L.; Osiceanu, P.; Munteanu, C.; Marcu, M.; Lete, C.; Spataru, N.; Fujishima, A., *Electrocatalysis* 2016, 7, 140-148; Pietron, J. J.; Pomfret, M. B.; Chervin, C. N.; Long, J. W.; Rolison, D. R., *J. Mater. Chem.* 2012, 22, 5197-5204).

The electrochemical properties of the supported Pt particles were examined in 0.1 M $HClO_4$ by cyclic voltammetry (CV). Initially, the samples were cycled from 0 V to 1.3 V to achieve a steady electrochemical state. No significant changes were observed in the hydrogen adsorption or oxide reduction regions of the CV for the Pt NPs supported on either the $RuO_2$ nanowires or the carbon NPs. The stability of the Pt NP/$RuO_2$ NW CV is consistent with the high degree of crystallinity of the $RuO_2$ support, which is less susceptible to structural reconfiguration under electrochemical conditions than hydrous $RuO_2$ supports. (Yang, L. X.; Allen, R. G.; Scott, K.; Christenson, P. A.; Roy, S., *Electrochim. Acta* 2005, 50, 1217-1223). In prior reports, the use of hydrous $RuO_2$ supports typically leads to significant capacitive effects due to their low conductivity and amorphous structure (Moghaddam, R. B.; Pickup, P. G., *Electrochem. Commun.* 2011, 13, 704-706; Huang, H.; Zhu, J.; Li, D.; Shen, C.; Li, M.; Zhang, X.; Jiang, Q.; Zhang, J.; Wu, Y., *J. Mater. Chem. A* 2017, 5, 4560-4567; 26; Pietron, J. J.; Pomfret, M. B.; Chervin, C. N.; Long, J. W.; Rolison, D. R., *J. Mater. Chem.* 2012, 22, 5197-5204; 27; Ho, V. T. T.; Nguyen, N. G.; Pan, C.-J.; Cheng, J.-H.; Rick, J.; Su, W.-N.; Lee, J.-F.; Sheu, H.-S.; Hwang, B.-J., *Nano Energy* 2012, 1, 687-695). In this case, the double layer capacitance is only slightly higher in the $RuO_2$ nanowire support, when compared to the carbon support. Without being bound by theory, this is attributed to the combined effects of the high crystallinity of the $RuO_2$ nanowire supports and the high conductivity of tetragonal $RuO_2$.

Figure 5A:
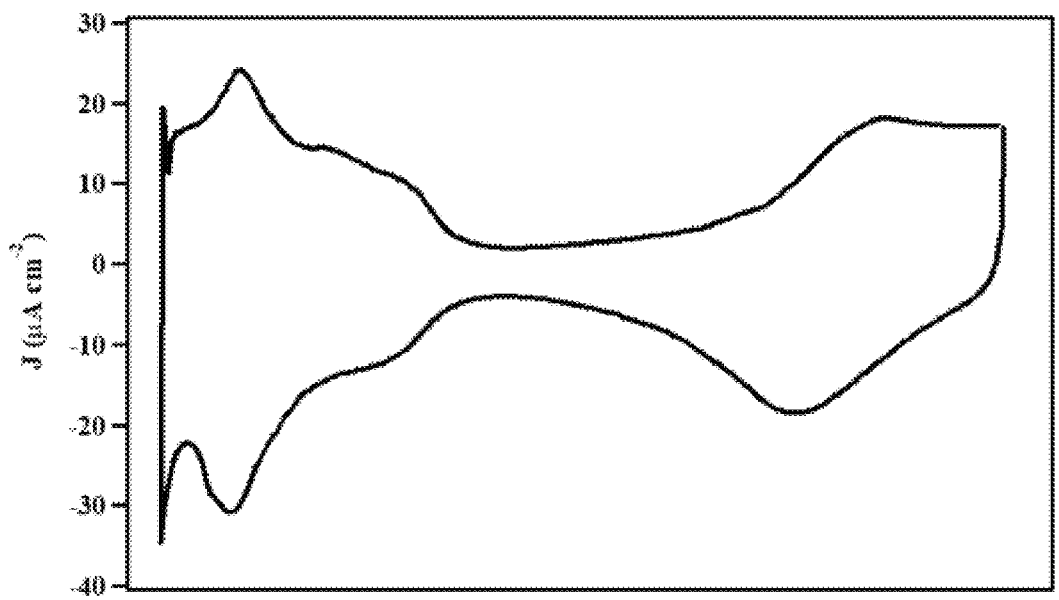
FIGS. 5A and 5B show cyclic voltammograms of Pt NP supported on Vulcan XC-72R carbon supports (Pt NP/C) (FIG. 5A) and Pt NP/$RuO_2$ NWs (FIG. 5B) catalysts obtained in 0.1 M $HClO_4$ at a scan rate of 20 mV·s$^{-1}$.
Figure 5B:
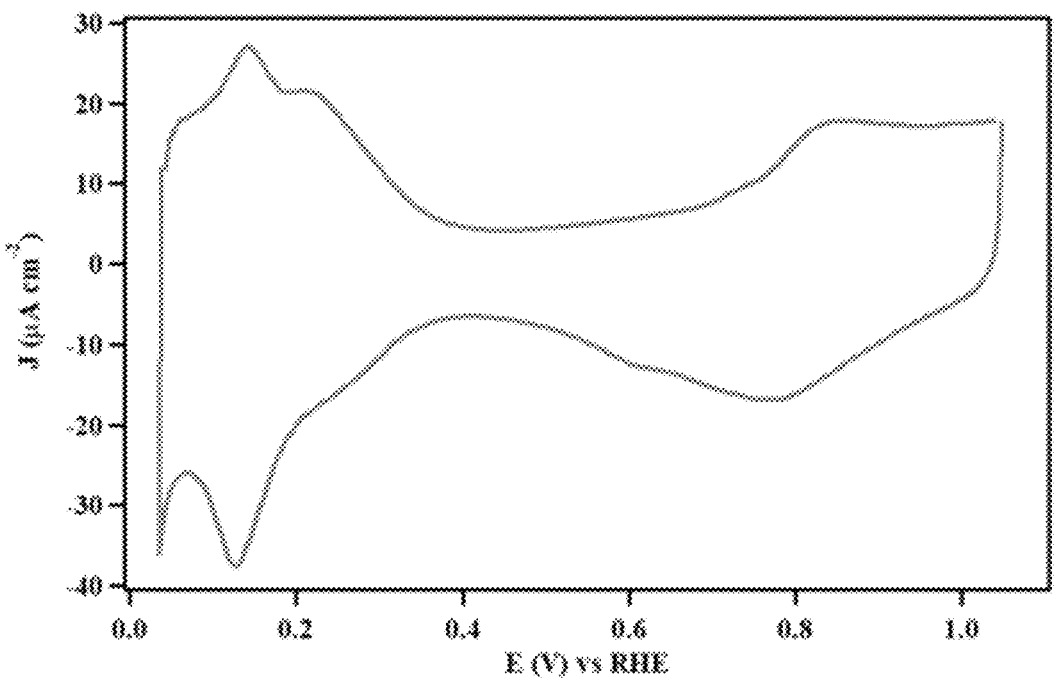

The CVs of the Pt NP/$RuO_2$ NW and Pt NP/C catalysts shown in FIG. 5 display the characteristic hydrogen adsorption/desorption region below 0.4 V. The reversible peak at 0.1 V is consistent with surface defect sites associated with spherical platinum nanostructures and suggests that both Pt catalysts have similar surface structures. (Koenigsmann, C.; Wong, S. S., *Energy Environ. Sci.* 2011, 4, 1161-1176; Koenigsmann, C.; Zhou, W.-p.; Adzic, R. R.; Sutter, E.; Wong, S. S., *Nano Lett.* 2010, 10, 2806-2811). The electrochemical surface area (ESA) was determined from the integrated hydrogen adsorption/desorption charge and both catalysts were found to have ESAs of approximately 50 $m^2 \cdot g^{-1}$ (Table 3). The similarities in surface structure and surface area of the Pt highlights the support material as a key factor in determining catalytic performance.

TABLE 3

Electrochemical data of Pt NPs as a function of support material.

| Catalyst | ESA, $m^2 \cdot g^{-1}$ | Onset Potential[1], mV | Specific Activity,[2] $mA \cdot cm^{-2}$ | Mass Activity,[2] $A \cdot mg^{-1}$ | Mass Activity at 2.5 h,[3] $A \cdot mg^{-1}$ |
|---|---|---|---|---|---|
| Pt NP/C | 53.8 | 681 | 0.26 | 0.14 | 0.11 |
| Pt NP/RuO$_2$ NW | 49.6 | 652 | 0.43 | 0.23 | 0.15 |

[1]Potential measured at J = 0.1 A · mg$^{-1}$.
[2]Current density measured at 0.7 V in LSVs.
[3]Measured via chronoamperometry at 0.7 V.

Both catalysts also display reversible oxidation of the Pt surface at potentials above 0.6 V. The position of the surface oxide reduction peak of the Pt NP/RuO$_2$ NW is located at 0.757 V, which is shifted by 41 mV to lower potentials when compared with the Pt NP/C. A similar shift is also observed in the onset for surface oxidation in the anodic sweep. These results collectively suggest that the interaction between the RuO$_2$ nanowire support and Pt NPs leads to a stronger interaction with oxygen adsorbates. The formation of surface oxide species at lower potentials is beneficial in the oxidation of organic molecules, since oxide species promote the oxidation of adsorbed CO intermediate at lower potentials.

Table 3 discloses catalysts where the catalyst metal is Pt. The catalyst need not be limited to Pt as a catalyst metal. For, as disclosed herein is a catalyst comprising a nanowire disclosed herein and a catalytic metal, wherein the nanowire supports the catalytic metal and the catalytic metal is selected from the group consisting of Pt, Au, Pd, Ru, Re, Rh, Os, Ir, Fe, Co, Ni, Cu, Ag, V, Cr, Mo, W, and mixtures thereof.

As in any above embodiment, a catalyst wherein the catalytic metal is Pt.

As in any above embodiment, a catalyst wherein the catalytic metal is a nanoparticle with an average size of about 0.5 to about 10 nm. In an embodiment, the nanoparticle has an average size of about 1.0 to about 9 nm, about 2 to about 8 nm, about 3 to about 7, or about 4 to about 6 nm. In an embodiment, the nanoparticle has an average size of about 0.5 nm, 1.0 nm, 1.5 nm, 2.0 nm, 2.5 nm, 3.0 nm, 3.5 nm, 4.0 nm, 4.5 nm, 5.0 nm, 5.5 nm, 6.0 nm, 6.5 nm, 7.0 nm, 7.5 nm, 8.0 nm, 8.5 nm, 9.0 nm, 9.5 nm, or about 10 nm. In an embodiment, the catalytic metal has a uniform size.

As in any above embodiment, a catalyst wherein the catalyst has a loading of catalytic metal on the nanowire of less than about 50%. In an embodiment, the catalyst has a loading of catalytic metal on the nanowire of less than about 40%, less than about 30%, less than about 20%, less than about 10%, less than about 5%, or less than about 2%. In an embodiment, catalyst has a loading of catalytic metal on the nanowire between about 1% to about 5%, about 5% to about 10%, about 10% to about 20%, about 20% to about 30%, about 30% to about 40%, or about 40% to about 50%

As in any above embodiment, a catalyst wherein there is direct contact between the catalytic metal and the surface of the nanowire.

As in any above embodiment, a catalyst wherein the catalyst has enhanced catalytic activity such that conversion of reactant to product in a reaction catalyzed by the catalyst is greater than at least 1.1 times the conversion of reactant to product in the same reaction under the same conditions but catalyzed by a catalyst prepared with a carbon based support.

As in any above embodiment, a catalyst wherein the nanowire does not contribute to significant oxidation of the surface of the Pt.

As in any above embodiment, a catalyst wherein the electrochemical surface area is in a range from about 20 $m^2/g$ to about 120 $m^2/g$, from about 25 $m^2/g$ to about 100 $m^2/g$, or from about 30 $m^2/g$ to about 80 $m^2/g$. In an embodiment, the electrochemical surface area is from about 40 $m^2/g$ to about 60 $m^2/g$, from about 42 $m^2/g$ to about 58 $m^2/g$, from about 44 $m^2/g$ to about 56 $m^2/g$, from about 46 $m^2/g$ to about 54 $m^2/g$, from about 48 $m^2/g$ to about 52 $m^2/g$, or about 50 $m^2/g$. In an embodiment, the electrochemical surface area is at least about 40 $m^2/g$, about 42 $m^2/g$, about 44 $m^2/g$, about 46 $m^2/g$, about 48 $m^2/g$, about 50 $m^2/g$, about 52 $m^2/g$, or about 54 $m^2/g$.

As in any above embodiment, a catalyst wherein the onset potential is in a range from about 10 mV to about 100 mV lower when compared to the onset potential of a catalyst prepared with a carbon based support. In an embodiment, the onset potential is in a range from about 10 mV to about 50 mV, from about 15 mV to about 45 mV, about 20 mV to about 40 mV, about 25 mV to about 35 mV, or about 30 mV lower when compared to the onset potential of a catalyst prepared with a carbon based support. In an embodiment, the onset potential of the catalyst is at least about 10 mV, at least about 15 mV, at least about 20 mV, at least about 25 mV, at least about 30 mV, at least about 35 mV, at least about 40 mV, at least about 45 mV, or at least about 50 mV lower when compared to the onset potential of a catalyst prepared with a carbon based support.

As in any above embodiment, a catalyst wherein the mass activity is in a range from about 0.10 A/mg to about 1.5 A/mg, from about 0.12 A/mg to about 0.40 A/mg, from about 0.15 A/mg to about 0.35 A/mg, or from about 0.20 A/mg to about 0.30 A/mg. In an embodiment, the mass activity is at least about 10 A/mg, at least about 15 A/mg, at least about 20 A/mg, at least about 21 A/mg, at least about 22 A/mg, at least about 23 A/mg, at least about 24 A/mg, at least about 25 A/mg, at least about 30 A/mg, at least about 35 A/mg, or at least about 40 A/mg.

d. Catalyst Performance

The present disclosure provides for the use of metal oxide nanowires as supports for catalytic metals, where the combination of the support and catalytic metal creates a catalyst suitable for use in catalytic reactions and related methods. These catalysts may be useful in any number of reactions catalyzed by a catalyst. Examples of reactions wherein catalysts may be employed are disclosed in Farrauto and Bartholomew, "Fundamentals of Industrial Catalytic Processes" Blackie Academic and Professional, first edition, 1997, which is hereby incorporated in its entirety. Other nonlimiting examples of reactions wherein nanowires having catalytic activity may be employed include: the oxidation of small organic molecules (such as methanol or formic acid); the oxidative coupling of methane (OCM) to ethane and ethylene; oxidative dehydrogenation (ODH) of alkanes to the corresponding alkenes, selective oxidation of alkanes, alkenes, and alkynes; oxidation of CO, dry reforming of methane, selective oxidation of aromatics; Fischer-Tropsch, hydrocarbon cracking; combustion of hydrocarbons and the like.

In an embodiment, the catalysts described herein are useful for the oxidation of small organic molecules. Small organic molecules include alcohols such as methanol and ethanol, carbohydrates such as glucose, small carboxylic acids, such as formic acid, amines, hydrocarbons, aldyhedes, ketones, and carbon monoxide.

In a further embodiment, the oxidation of small organic molecules comprises the oxidation of methanol (i.e., methanol oxidation reaction (MOR)).

Advantages associated with the catalysts disclosed herein are clearly demonstrated when used in the SOM oxidation reactions. In particular, the advantages are derived from the novel crystalline nanowires disclosed herein. These nanowires reduce poisoning of the catalytic metal, and particularly reduce the poisoning of the catalytic metal when the poisoning species is a partially oxidized organic molecule.

Figure 6A:
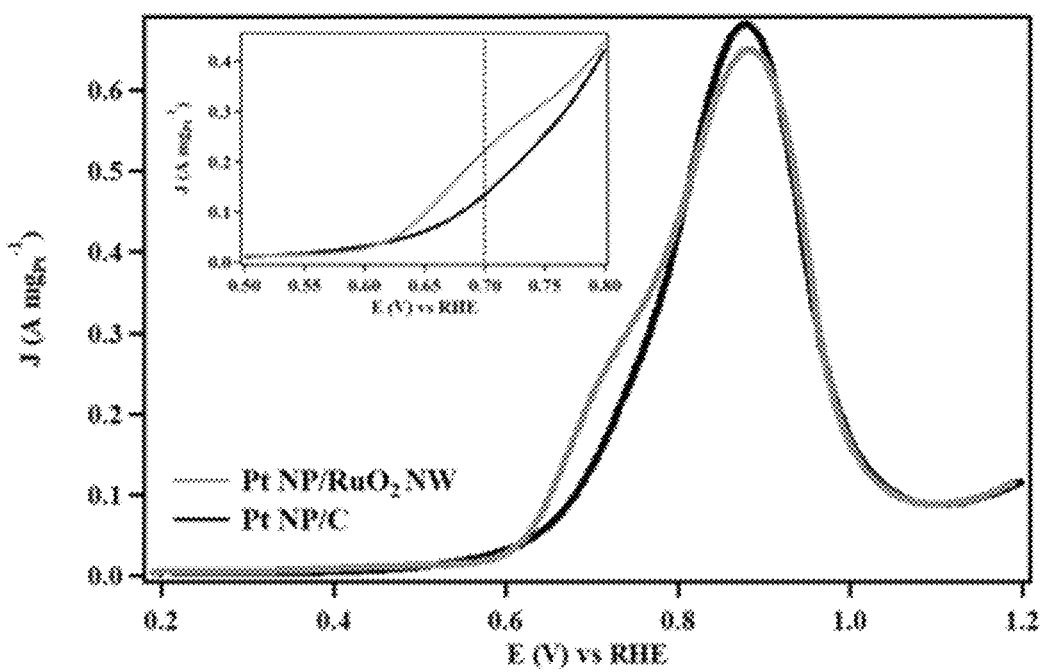
FIGS. 6A and 6B show the electrocatalytic performance for methanol oxidation of supported Pt NPs. Linear sweep voltammograms (LSVs, FIG. 6A) normalized to Pt mass collected in 0.1 methanol and 0.1 M $HClO_4$ at a scan rate of 20 mV·s$^{-1}$. The inset highlights the onset region for methanol oxidation.

The oxidation performance was examined via linear sweep voltammetry and chronoamperometry in a deoxygenated solution of the desired organic molecules with a concentration of 0.1 M prepared in 0.1 M $HClO_4$ electrolyte. In a linear sweep voltammogram, the potential applied to the working electrode comprising a glassy carbon electrode coated with the catalyst is increased. The oxidation of substrate is indicated by an anodic (oxidation) current, which can be used to deduce both the onset potential for oxidation and the rate of the oxidation reaction. The linear sweep voltammograms (LSVs) depicted in FIG. 6A reveal the catalytic performance of the supported Pt NPs toward MOR. Comparison of the LSVs indicates that $RuO_2$ nanowire support contributes to a significant enhancement in catalytic activity (i.e. oxidation current) over the entire onset region (FIG. 6A inset) relative to the carbon support. As a control, LSVs were collected from $RuO_2$ nanowire and carbon supports and no appreciable faradaic current was observed. Thus, the methanol oxidation results from the presence of Pt. To quantify the effect of the support on catalytic performance of the Pt NPs, the onset potentials measured at a current density of 0.1 $A·mg^{-1}$ and mass and specific activities at 0.7 V are shown in Table 3 for the $RuO_2$ NW and Pt NP/C. The onset for MOR is shifted by 30 mV to lower potentials in the Pt NP/$RuO_2$ NW catalyst showing a lower overpotential for methanol activation and oxidation.

Figure 12:
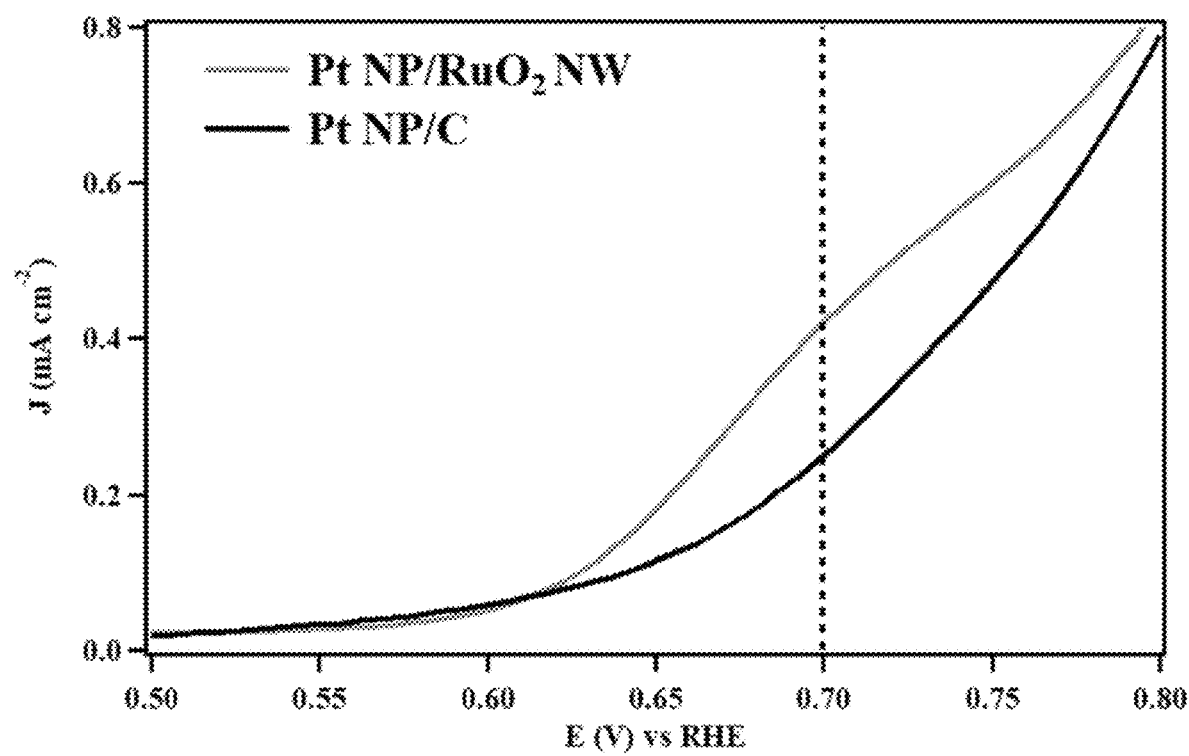
FIG. 12 shows MOR specific activity collected in 0.1 M methanol/0.1 M $HClO_4$ at a scan rate of 20 $mV·s^{-1}$.

The mass activity of the Pt NP/$RuO_2$ NW catalyst was determined to be 0.23 $A·mg^{-1}$ representing a 1.6-fold enhancement in activity compared with the Pt NP/C. A similar enhancement of 1.7-fold was also noted in the specific activity of the $RuO_2$ nanowire catalysts (FIG. 12). Collectively, these results suggest that the $RuO_2$ support leads to significant improvements of the MOR activity at low overpotentials. Although it is difficult to compare results with those obtained in prior reports under different conditions, the Pt NP/$RuO_2$ NW catalysts disclosed herein maintain comparable or better results. For example, Ahn and co-workers observed activities of 0.05 $A·mg^{-1}$ for Pt NP supported on crystalline Ru/$RuO_2$ nanofiber supports at approximately 0.7 V with a methanol concentration of 2 M in sulfuric acid with a scan rate of 50 $mV·s^{-1}$. (An, G.-H.; Lee, E.-H.; Ahn, H.-J., *Phys. Chem. Chem. Phys.* 2016, 18, 14859-14866). In terms of hydrous ruthenium oxide supports, Fujishima and co-workers observed specific activities of 0.1 $mA·cm^{-2}$ for hybrid Pt/hydrous ruthenium oxide nanostructures on conductive diamond at approximately 0.7 V in 0.1 M $HClO_4$ containing 3.2 M methanol. (Spătaru, T.; Preda, L.; Osiceanu, P.; Munteanu, C.; Marcu, M.; Lete, C.; Spataru, N.; Fujishima, A., *Electrocatalysis* 2016, 7, 140-148).

Figure 6B:
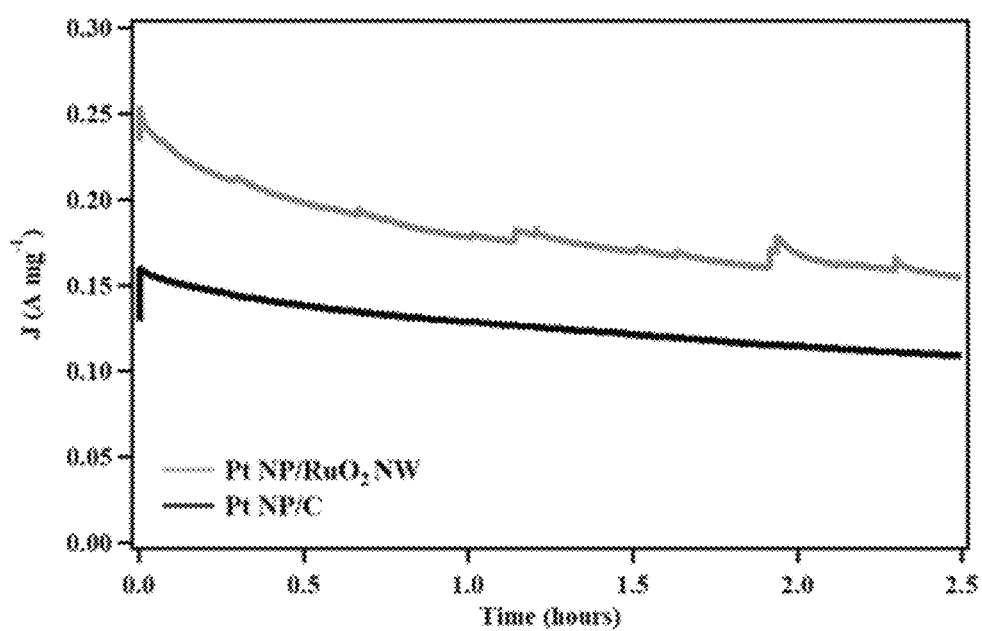

To evaluate the long-term stability of the Pt catalysts and supports, chronoamperometry was performed at 0.7 V. In chronoamperometry, the potential of the working electrode is stepping to a potential where the catalyst will oxidize the substrate and the oxidation current is measured for a period of time. The chronoamperograms in FIG. 6B show that both catalysts undergo a brief induction period of 1-2 minutes where catalytic activity increases from the values measured in the LSV. This can be attributed to an activation of the Pt surface sites as a result of the surface oxidation that occurs at these potentials. Subsequently, the activity (oxidation current) of both catalysts decreases, approaching steady-state values of 1.5 $A·mg^{-1}$ and 1.1 $A·mg^{-1}$ for the Pt NP/$RuO_2$ NW and Pt NP/C catalysts, respectively. Over the course of the test, the Pt NP/$RuO_2$ NWs maintain a higher mass activity confirming that the enhanced performance in the LSV is retained after several hours of operation. Moreover, the Pt NP/$RuO_2$ NW catalysts evolved $CO_2$ gas, which was visible in the first 10 minutes of the stability test. The significant bubble formation resulted in the saw-tooth pattern in the chronoamperogram. By contrast, there was far less visible gas formation from the Pt NP/C electrode. This result suggests that the $RuO_2$ nanowire support leads to a higher faradaic efficiency in the oxidation of methanol to $CO_2$.

Figure 7A:
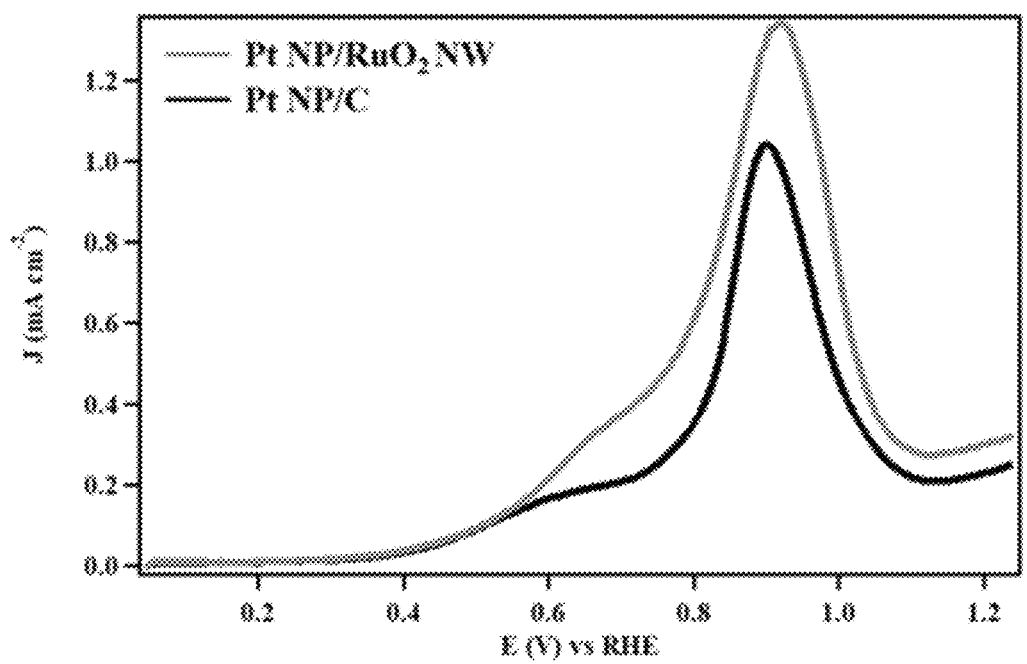
FIGS. 7A and 7B show LSVs (FIG. 7A) collected in 0.1 M formic acid and CO stripping voltammograms (FIG. 7B) collected in 0.1 M $HClO_4$ at scan rates of 20 mV·s$^{-1}$. Prior to CO, stripping electrodes were immersed in a CO saturated 0.1 M $HClO_4$ solution for a period of 45 min.
Figure 7B:
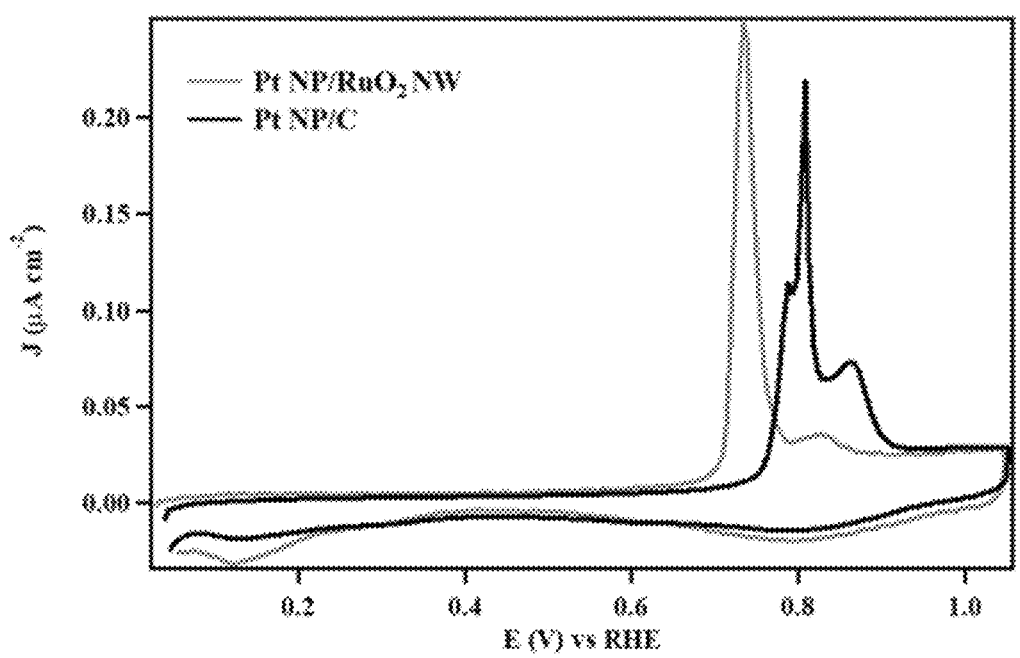

Also investigated was the activity of the catalysts toward the oxidation of two other examples of small organic molecules: formic acid (Equation 2) and carbon monoxide. Like methanol, formic acid has been previously highlighted as a potential fuel source for polymer electrolyte membrane fuel cells. LSVs of formic acid oxidation are shown in FIG. 7A. The Pt NP/$RuO_2$ NW catalysts maintain higher overall specific activity over the entire formic acid oxidation window, which is consistent with the enhanced SOM oxidation performance. The oxidation of carbon monoxide is important both as a potential fuel source and for the electrochemical detection and quantification of ambient CO levels for CO detectors. To determine the relative onset for CO oxidation, CO stripping voltammograms (FIG. 7B) were obtained after allowing the catalysts to fully adsorb CO from a saturated solution. The CO stripping peak in the Pt NP/$RuO_2$ NWs occurs at 734 mV, which is more than 75 mV lower than the onset for CO stripping in Pt NP/C. This further indicates that the Pt NP/$RuO_2$ NWs are better overall catalysts for the oxidation of a wide range of SOM substrates.

$$HCOOH \rightarrow CO_2 + 2H^+ + 2e^- \qquad (2)$$

Formic acid and carbon monoxide were investigated because they are key intermediates in the mechanism of methanol oxidation. (Hamnett, A., *Interfacial Electrochemistry: Theory, Experiment and Applications*, Wieckowski, A., Ed. Marcel Dekker: New York, N.Y., 1999; pp 843-879; Hartnig, C.; Jorissen, L.; Lehnert, W.; Scholta, J., *Materials for Fuel Cells*, Gasik, M., Ed. Woodhead Publishing: Oxford, U K, 2008; pp 185-208). The indirect mechanism for pure platinum and platinum enriched alloy catalysts is observed because of the high density of Pt active sites on the surface. In these catalysts, the dehydrogenation of methanol occurs at Pt—Pt pair sites resulting in the rapid formation of an adsorbed CO intermediate at low overpotentials. The complete oxidation of CO to $CO_2$ is delayed to higher potentials since CO oxidation requires the presence of adsorbed oxygen species, which do not form on Pt at potentials below 0.5-0.6 V. Thus, the high coverage of CO inhibits MOR activity and requires a high overpotential to achieve effective MOR kinetics.

The formic acid oxidation LSVs in FIG. 7A for both catalysts are characterized by a peak in the region of 0.8-1.1 V with a corresponding shoulder at lower potentials. In terms of the mechanism, the peak-shoulder feature in the LSVs of both catalysts has been shown to be associated with catalysts that undergo an indirect mechanism for the oxidation of methanol. (Koenigsmann, C.; Wong, S. S., *ACS*

*Catalysis* 2013, 3, 2031-2040; Cui, C.-H.; Li, H.-H.; Cong, H.-P.; Yu, S.-H.; Tao, F., *Chem. Commun.* 2012, 48, 12062-12064).

Since CO is the primary, rate-limiting intermediate of the indirect pathway, the kinetics of methanol oxidation are highly dependent upon the catalyst's ability to oxidize CO. Based on the results in FIG. 7B, it is evident that the $RuO_2$ substrate results in a significant decrease in the overpotential associated with CO oxidation by 75 mV. In addition, the onset for CO oxidation for both catalysts is closely aligned with the onset in the MOR LSVs, suggesting that CO oxidation limits the kinetics at low overpotentials. Thus, the enhanced MOR activity in the $RuO_2$ nanowire supports can be attributed to improved CO oxidation performance induced by the $RuO_2$ support. Enhanced performance in $RuO_2$-based supports may be attributed to a variety of effects including improved catalyst dispersion, improved transport of hydroxyl and proton species at the catalytic interface, improved CO tolerance due to a bifunctional effect, as well as the beneficial changes in the electronic structure of Pt from the strong metal/support interaction (SMSI) effect.

A common explanation for the enhanced performance in metal oxide supported Pt is derived from the bifunctional mechanism of methanol oxidation in $Pt_{1-x}Ru_x$ alloys. In PtRu alloys, the Ru surface sites are oxidized at much lower potentials forming Ru—OH surface species, which facilitate the oxidation of the CO intermediate formed on the Pt sites. Like metallic Ru, metal oxides also facilitate the formation of surface hydroxyl species at low overpotentials. However, unlike in uniform PtRu alloys, effective CO oxidation via the bifunctional mechanism can only take place at the Pt—$RuO_2$ interface. The diffusion of CO from isolated Pt sites to the Pt—$RuO_2$ interface should also be relatively slow because of the strong adsorption of CO on Pt. Moreover, $RuO_2$ catalysts form relatively thick oxide layers on the surface in the potential window for MOR on Pt, which may also slow the transport of hydroxyl groups to Pt catalysts. Thus, without being bound by theory, the enhanced activity observed with the current catalysts cannot solely be attributed to the bifunctional effect but is a combination of a bifunctional effect and electronic effect of the support on the Pt catalyst.

In terms of the electronic effect, oxide supports lead to significant changes of the electronic structure of Pt via the Strong Metal-Support Interaction (SMSI) effect. For example, X-ray absorption spectra of Pt NPs supported on mixed Ti—Ru metal oxides showed significant variations in the d-band vacancy of the supported Pt NPs relative to pure Pt. In the case of the hydrous $RuO_2$ supports, XPS measurements show that the SMSI effect is strong and leads to partial, irreversible oxidation of the Pt particle surface. Although this increases the available oxide species for the bifunctional oxidation of CO, the oxidation of the Pt particles leads to a reduction of the available Pt active sites, thus lowering the mass activity of the catalyst.

Irreversible oxidation was not observed for the Pt NPs supported by crystalline $RuO_2$ support when measured with XPS. From the CV results, the crystalline $RuO_2$ has a less significant effect on the Pt, leading to a measurable increase in the oxophilicity of the Pt surface sites, as indicated by the 41 mV shift in the oxide peak. The stronger interaction with oxide species and the lower onset for surface oxidation facilitates CO oxidation on the Pt particle itself as well as at the Pt—$RuO_2$ interface. Thus, the advantages of crystalline $RuO_2$ extend beyond improved stability and conductivity and also contribute to improvements in the mechanism of MOR relative to hydrous ruthenium oxide.

As disclosed herein is a method for performing an oxidation reaction, where the oxidation reaction comprises oxidation of a small organic molecule using a catalyst as described herein. In an embodiment, the small organic molecule being oxidized is methanol, formic acid, or carbon monoxide.

As in any above embodiment, a method wherein the catalyst reduces poisoning of the catalytic metal.

As in any above embodiment, a method wherein the poisoning is caused by a poisoning species wherein the poisoning species is a partially oxidized organic molecule.

D. EXAMPLES

The following preparations and examples are given to enable those skilled in the art to more clearly understand and to practice the present invention. They should not be considered as limiting the scope of the invention, but merely as being illustrative and representative.

1. General Experimental Preparation of $RuO_2$ Nanowires

The $RuO_2$ nanowires were synthesized using a modified sol-gel method. Briefly, 0.42 grams of $RuCl_3 \cdot xH_2O$ was dissolved in 3.5 mL of 200 proof ethanol. The solution was stirred using a magnetic stir bar for 1-2 hours to ensure complete dissolution of the $RuCl_3$. Once a homogenous solution was obtained, the solution was filtered through a 200 nm polycarbonate template (Whatman, Nucleopore track etch) using vacuum filtration and a glass frit support. Approximately 50 drops were distributed over the template with applied vacuum to load the pores of the template with $RuCl_3$. Following this loading procedure, the template was polished using an Arkansas whetstone to remove excess Ru precursor on the surface of the template.

The loaded template was subsequently placed in a glass reactor containing 2 mL of propylene oxide and was heated to 65° C. Care was taken to keep the template sequestered from the liquid propylene oxide to prevent dissolution of the template. The Ru precursor in the template reacted with the propylene oxide vapors for a period of 5 minutes. The formation of the hydrous $RuO_2$ gel was indicated by change in the color of the template from a red-brown color to black. After treatment with propylene oxide, the template was placed into a porcelain crucible and heated to 600° C. in a muffle furnace for 30 minutes. Following this heating procedure, the crucible was removed from the furnace and allowed to cool to room temperature. The samples were then collected for further analysis.

To deposit small platinum nanoparticles onto the $RuO_2$ support, as synthesized $RuO_2$ nanowires (~2 mg) were dispersed into 1.25 mL of deionized water by sonication for 5 minutes. The solution containing the $RuO_2$ nanowires was combined with a 1 mL aliquot of a solution containing dihydrogen hexachloroplatinic acid ($H_2PtCl_6$, Alfa Aesar, 99+%). The concentration of the $H_2PtCl_6$ solution was prepared to yield 20% by mass Pt in the resulting Pt/$RuO_2$ NWs. The solution containing both $RuO_2$ and $H_2PtCl_6$ was stirred for 5 minutes before the addition of 1 mL of an aqueous $NaBH_4$ solution (Alfa Aesar, 98%, 3 mg/mL). The deposition proceeded for a period of 30 minutes before the product was collected by centrifugation and washed with water 3 times.

The same procedure was performed to deposit Pt NPs on commercial Vulcan XC-72R carbon nanoparticles.

2. Development of a Two-Step Sol-Gel Technique for the Production of Crystalline $RuO_2$ Nanowires Vacuum filtration is usually effective at filling the pores of the anodic alumina and polycarbonate filter membranes.

Typically, the gelling agent is added to the precursor sol to initiate gelation before the template pores are impregnated. However, this standard approach led to the formation of a thin layer of bulk material on the surface of the template (FIG. 8A) that was impossible to remove before annealing via washing the template (FIG. 8B) or after annealing by polishing the template. Both of these approaches led to a loss of the desired one-dimensional, nanowire morphology.

To overcome this issue, a two-step protocol was developed to avoid the formation of a $RuO_2$ thin film. In the first step, the template was loaded with the ruthenium sol before gelation via vacuum impregnation. Loading the template with the precursor sol had two important benefits: 1) a higher loading could be achieved inside of the pores due to the lower viscosity of the sol as compared with the sol-gel, and 2) residues of the dry sol could be easily removed by polishing the surfaces of the template on a Whetstone. Since the polycarbonate membrane is unstable to direct contact with propylene oxide, a modified glass-petri dish was used as a glass-reactor to expose the impregnated filter membrane to saturated propylene oxide vapors to complete the gelation directly inside of the pores. The progress of the reaction was tracked by the color change of the template from the reddish-brown color of the sol to the black color of the sol-gel. The reaction proceeded for 30 minutes to allow for complete gelation. In the final step, the template was annealed to simultaneously crystallize the gel into $RuO_2$ nanowires and vaporize the template material.

3. Characterization and Electrochemical Measurements

Powder X-ray diffraction (XRD) studies were performed on a Bruker D2 Phaser equipped with a scintillation detector. To prepare the samples, a concentrated paste was prepared by dispersing the sample into a small amount of either ethanol or isopropyl alcohol. This slurry was then deposited, dropwise, onto a zero-background Si wafer holder. X-ray diffraction patterns were collected from 20°-60° in 2 theta.

SEM studies were conducted on a Zeiss EVO MA-10 electron microscope equipped with a $LaB_6$ filament at an accelerating voltage of 15 kV. Energy dispersive X-ray spectroscopy (EDX) measurements were performed on an Oxford X-max spectrometer. The samples were prepared for imaging by first dispersing a small amount of the product into ethanol by vortex mixing. Sonication was avoided to ensure that the morphology of the nanowires was maintained. Following vortex mixing, a drop of the dispersion was placed onto a silicon wafer and allowed to air dry. HRTEM analysis was conducted on a FEI Talos F200X S/TEM at an accelerating voltage of 200 kV. To prepare the samples for HRTEM analysis, they were sonicated briefly in ethanol to produce a dilute slurry. Then ~100 μL of the slurry was deposited onto a 400 copper grid covered with a layer of holey carbon.

The precise Pt loading in the Pt $NP/RuO_2$ NW sample was determined by inductively coupled plasma mass spectrometry (ICPMS, ThermoElectron X Series) obtained from the catalyst dissolved in a 1:3 mixture of nitric acid and hydrochloric acid. The instrument was calibrated for Pt ion concentration using a Pt standard solution (Spex CertiPrep, 1 μg·mL$^{-1}$ Pt in 2% HCl) diluted in nitric acid (Fisher Scientific, Optima Grade). The Pt loading in the Pt NP/C sample was determined from thermogravimetric analysis (TGA, TA Instruments Q500). The temperature was ramped at a rate of 20° C.·min$^{-1}$ to 700° C. in ultra-dry air until a stable mass of Pt was obtained. TGA was also performed on the $RuO_2$ nanowires to determine their crystallinity. The temperature was ramped at a rate of 10° C.·min$^{-1}$ to 800° C. in ultra-dry air.

X-ray photoelectron spectroscopy was performed on a PHI Quantera XPS instrument. The powders were supported on silicon wafers prior to analysis. The data was collected with monochromatic Al Kα radiation with a 25 W beam and a 100 μm spot size. Survey scans were collected at a 45° photoelectron takeoff angle with a 280 eV analyzer pass energy at 1.0 eV per step. High-resolution scans for the platinum, ruthenium, and oxygen elements were referenced to the Si 2p (99.6 eV) of metallic Si peak of the substrate. The Si peak of the substrate was used as a reference since the carbon peaks, which are traditionally used as a reference, overlap with the peaks for ruthenium. Survey scans and fits of the high-resolution XPS data, peak positions, and peak assignments can be found in FIGS. 8A, 8B, 11A, 11B, and 11C.

Figure 11A:
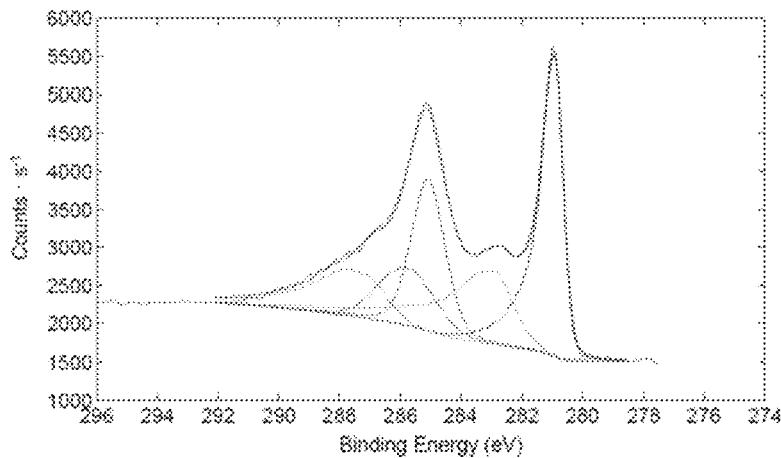
FIGS. 11A-11C show high resolution scans including fits of the Ru 3d (FIG. 11A) and Pt 4f (FIG. 11B) regions for the Pt NP/$RuO_2$ NWs and the Pt 4f region of the Pt NP/C (FIG. 11C). Peak assignments and locations are presented in the corresponding tables.

Listing of peak data for the spectrum in FIG. 11A:

| Position (eV) | % Area | Assignment |
| --- | --- | --- |
| 280.9 | 31 | $Ru^{4+}$ $3d_{5/2}$ |
| 282.9 | 21 | |
| 285.1 | 4 | $Ru^{4+}$ $3d_{3/2}$ |
| 287.1 | 14 | |
| 285.8 | 3 | C1s |

Figure 11B:
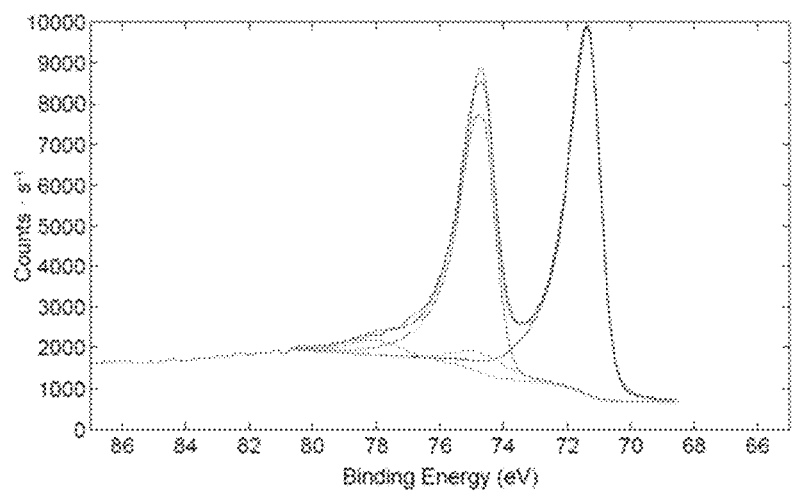

Listing of peak data for the spectrum in FIG. 11B:

| Position (eV) | % Area | Assignment |
| --- | --- | --- |
| 71.3 | 53 | $Pt^0$ $4f_{7/2}$ |
| 74.6 | 40 | $Pt^0$ $4f_{5/2}$ |
| 74.7 | 4 | $Pt^{4+}$ $4f_{7/2}$ |
| 78.0 | 3 | $Pt^{4+}$ $4f_{5/2}$ |

Figure 11C:
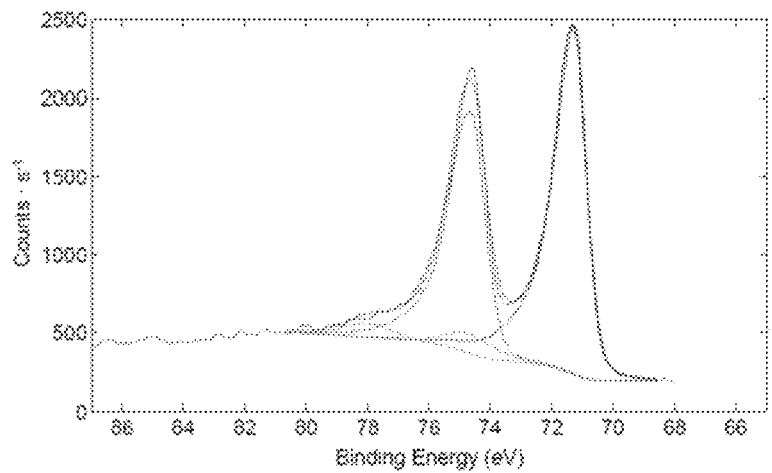

Listing of peak data for the spectrum in FIG. 11C:

| Position (eV) | % Area | Assignment |
| --- | --- | --- |
| 71.3 | 53 | $Pt^0$ $4f_{7/2}$ |
| 74.6 | 40 | $Pt^0$ $4f_{5/2}$ |
| 74.7 | 4 | $Pt^{4+}$ $4f_{7/2}$ |
| 78.0 | 3 | $Pt^{4+}$ $4f_{5/2}$ |

The Pt $NP/RuO_2$ NW and Pt NP/C catalysts were dispersed into absolute ethanol with a concentration of 2 mg·mL$^{-1}$ to form catalyst inks. Glassy carbon rotating disk electrodes (GC-RDE, Pine Instruments, 5 mm) were polished with aluminum oxide pastes until a mirror finish was achieved. The catalysts were loaded onto the GC-RDE by adding a 5 μL aliquot of the catalyst to the electrode and allowing it to air dry. To improve the dispersion of the catalyst, the GC-RDE was pre-modified with a thin layer of Vulcan carbon before depositing the Pt $NP/RuO_2$ NW catalysts. In both cases, the electrode was sealed by adding a 5 μL drop of Nafion, (0.025% in absolute ethanol) which was allowed to air dry. The sealed electrodes were immersed into ultrapure water (18.2 MΩ·cm, Millipore Direct Q5) to remove residual impurities.

Electrochemical experiments were performed with a Pine Instruments WaveDriver20 bipotentiostat and a custom three electrode cell. An Ag/AgCl (3 M Cl$^-$) reference electrode housed in a double junction chamber supplied by BASi Instruments and a Pt counter electrode (Alfa Aesar, 3.0 cm$^2$ active area) served as the reference and counter electrodes respectively. Cyclic voltammograms were obtained in deoxygenated 0.1 M $HClO_4$ prepared by diluting the concentrated acid (Fisher Scientific, Optima grade) in ultrapure water. The methanol oxidation and formic acid oxidation performance was examined via linear sweep voltammetry and chronoamperometry in a deoxygenated solution of 0.1 M methanol or formic acid (Fisher Scientific, Optima grade) and 0.1 M $HClO_4$. Carbon monoxide stripping voltammetry was performed after immersing the electrode in a CO saturated solution for a period of 45 minutes. All potentials are reported with respect to the reversible hydrogen electrode (RHE). The electrochemically accessible surface area (ESA) of Pt was determined from the integrated hydrogen adsorption ($H_{ads}$) charge in the cyclic voltammogram, utilizing the conversion factor 0.21 $mC \cdot cm^{-2}$. The capacitive contribution of the support material was removed during the integration of the $H_{ads}$ peaks.

It will be apparent to those skilled in the art that various modifications and variations can be made in the present invention without departing from the scope or spirit of the invention. Other aspects of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A nanowire comprising a metal oxide, wherein the nanowire has a diameter from about 1 nm to about 300 nm as measured by TEM, wherein
   the nanowire is crystalline,
   the nanowire has a length from about 0.05 μm to about 3 μm,
   the nanowire has a solid core of metallic ruthenium; and
   the metal oxide is selected from the group consisting of $RuO_2$, $Cr_2O_3$, CoO, NiO, $Fe_2O_3$, $MnO_2$, $V_2O_3$, CuO, $WO_2$, $TiO_2$, MgO, CaO, $La_2O_3$, $Mn_2O_3$, $Sm_2O_3$, $Eu_2O_3$, and $Pr_2O_3$.

2. The nanowire of claim 1, wherein the metal oxide is a single metal oxide species.

3. The nanowire of claim 2, wherein the metal oxide is $RuO_2$.

4. The nanowire of claim 1, wherein the nanowire does not have a surface coating.

5. A catalyst comprising the nanowire of claim 1 and a catalytic metal, wherein the nanowire supports the catalytic metal and the catalytic metal is selected from the group consisting of Pt, Au, Pd, Ru, Re, Rh, Os, Ir, Fe, Co, Ni, Cu, Ag, V, Cr, Mo, W, and mixtures thereof.

6. The catalyst of claim 5, wherein the catalytic metal is Pt.

7. The catalyst of claim 6, wherein the catalytic metal is a nanoparticle with an average size of about 0.5 to about 10 nm.

8. The catalyst of claim 5, wherein the catalyst has a loading of catalytic metal on the nanowire of less than about 50%.

9. The catalyst of claim 5, wherein there is direct contact between the catalytic metal and the surface of the nanowire.

10. The catalyst of claim 5, wherein the catalyst has enhanced catalytic activity such that conversion of reactant to product in a reaction catalyzed by the catalyst is greater than at least 1.1 times the conversion of reactant to product in the same reaction under the same conditions but catalyzed by a catalyst prepared with a carbon-based support.

11. The catalyst of claim 5, wherein the nanowire does not contribute to significant oxidation of the surface of the Pt.

12. The catalyst of claim 6, wherein the electrochemical surface area is in a range from about 20 $m^2/g$ to about 120 $m^2/g$.

13. The catalyst of claim 6, wherein the onset potential is in a range from about 10 mV to about 100 mV lower when compared to the onset potential of a catalyst prepared with a carbon based support.

14. The catalyst of claim 6, wherein the mass activity is in a range from about 0.10 A/mg to about 1.5 A/mg.

15. The nanowire of claim 3, wherein the $RuO_2$ nanowire exhibits an XRD pattern, which has following peaks: 2 theta degree of 28.0 with intensity (counts) of 169.07; 2 theta degree of 35.1 with intensity (counts) of 85.39; 2 theta degree of 38.4 with intensity (counts) of 8.09; 2 theta degree of 40.0 with intensity (counts) of 17.08; 2 theta degree of 40.5 with intensity (counts) of 12.80; 2 theta degree of 42.2 with intensity (counts) of 7.68; 2 theta degree of 44.0 with intensity (counts) of 20.90; 2 theta degree of 45.1 with intensity (counts) of 5.12; 2 theta degree of 54.1 with intensity (counts) of 40.56; 2 theta degree of 58.0 with intensity (counts) of 14.09; 2 theta degree of 59.6 with intensity (counts) of 6.83.

16. A method of preparing the nanowire of claim 1, the method comprising:
   a) impregnating, by vacuum filtration, a polycarbonate filter membrane with a metal sol, wherein the polycarbonate filter membrane has a nominal pore diameter of about 200 nm;
   b) loading an ethanol solution onto a template;
   c) polishing the surface of the impregnated filter membrane;
   d) exposing the polished impregnated filter membrane from step c) to a gelling agent;
   e) annealing the impregnated filter membrane from step d) at an elevated temperature for a period of time; and
   f) isolating the nanowire of claim 1.

17. The method of claim 16, wherein the metal halide is $RuCl_3$.

18. The method of claim 16, wherein the elevated temperature is from about 300° C. to about 800° C.

19. The method of claim 16, wherein the period of time is from about 10 minutes to about 300 minutes.

* * * * *

UNITED STATES PATENT AND TRADEMARK OFFICE
CERTIFICATE OF CORRECTION

PATENT NO. : 11,879,176 B2
APPLICATION NO. : 16/739498
DATED : January 23, 2024
INVENTOR(S) : Koenigsmann et al.

It is certified that error appears in the above-identified patent and that said Letters Patent is hereby corrected as shown below:

In the Specification

Column 2, Line 22: after "below" add --.--;
Column 3, Line 31: delete "supports" and insert --support-- therefor;
Column 11, Line 54: after "reaction" insert --occurred--;
Column 12, Line 33: delete the "," after "is about 600° C.";
Column 12, Line 64: after "2" add --,--;
Column 12, Line 65: after "has" add --the--;
Column 13, Line 13: delete "lso" and insert --also-- therefor;
Column 17, Line 42: delete "7," and insert --7 nm,-- therefor;
Column 17, Line 54: insert --the-- after "embodiment,";
Column 17, Line 55: insert --between-- after "1% to about 5%,";
Column 17, Line 56: insert --between-- after "10%,";
Column 17, Line 56: insert --between-- after "20%,";
Column 17, Line 57: before "about 30%" insert --between--;
Column 17, Line 57: after "or" insert --between--;
Column 17, Line 57: after "50%" insert --.--;
Column 18, Line 25: delete "catalystis" and insert --catalyst is-- therefor;
Column 19, Line 64: delete "stepping" and insert --stepped-- therefor;
Column 20, Line 49: delete "U K" and insert --UK-- therefor;
Column 24, Line 56: delete "Nafion, (0.025% in absolute ethanol) which" and insert --Nafion(0.025% in absolute ethanol), which-- therefor; and
Column 26, Line 21: delete "has following" and insert --has the following-- therefor.

Signed and Sealed this
Fourth Day of June, 2024

Katherine Kelly Vidal
*Director of the United States Patent and Trademark Office*

Page 1 of 1